(12) United States Patent
Quatmann

(10) Patent No.: US 10,990,681 B2
(45) Date of Patent: Apr. 27, 2021

(54) SYSTEMS, METHODS, AND DEVICES FOR CONTROLLING SMART FABRICS IN AIRCRAFT

(71) Applicant: AIRBUS OPERATIONS GMBH, Hamburg (DE)

(72) Inventor: Frank Quatmann, Seevetal (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 30 days.

(21) Appl. No.: 16/363,436

(22) Filed: Mar. 25, 2019

(65) Prior Publication Data

US 2019/0303581 A1 Oct. 3, 2019

Related U.S. Application Data

(60) Provisional application No. 62/649,888, filed on Mar. 29, 2018.

(51) Int. Cl.
*G06F 21/57* (2013.01)
*G06F 8/71* (2018.01)
(Continued)

(52) U.S. Cl.
CPC ........ G06F 21/572 (2013.01); B64D 11/0015 (2013.01); B64D 11/0647 (2014.12);
(Continued)

(58) Field of Classification Search
CPC ..... G06F 8/61; G06F 8/65; G06F 8/71; G06F 21/34; G06F 21/572; B64D 11/0647;
(Continued)

(56) References Cited

U.S. PATENT DOCUMENTS 8,010,257 B2* 8/2011 Shidai ................ B60R 16/0231
 701/48
8,653,690 B2* 2/2014 Petitpierre ......... B64D 11/0015
 307/9.1
(Continued)

FOREIGN PATENT DOCUMENTS

CN 110316380 A 10/2019
DE 10 2006 017 732 A1 10/2007
(Continued)

OTHER PUBLICATIONS

Bellingham, et al., "Direct Integration of Individually Controlled Emissive Pixels into Knit Fabric for Fabric-Based Dynamic Display," IEEE Photonics Journal, Vo. 9, No. 4, pp. 1-10, Aug. 1, 2017.
(Continued)

*Primary Examiner* — Douglas M Slachta
(74) *Attorney, Agent, or Firm* — Jenkins, Wilson, Taylor & Hunt, P.A.

(57) ABSTRACT

Systems and methods for controlling smart fabrics. In some embodiments, the smart fabrics are attached to vehicle seats, benches, and/or beds. In some embodiments, the smart fabrics enable digital components to be embedded in them and can be configured to modify their physical behavior including changing their color, breathability, stiffness, as well as other properties, depending on the applications the fabric is being utilized for. In order to control these smart fabrics and the different properties of them, smart fabric controllers are provided as well as one or more vehicle controllers that help to give instructions and update the firmware of each of the one or more smart fabric controllers on the vehicle.

21 Claims, 20 Drawing Sheets

(51) Int. Cl.

| | | |
|---|---|---|
| *H04L 29/08* | (2006.01) | |
| *G06F 8/61* | (2018.01) | |
| *B64D 11/00* | (2006.01) | |
| *G06F 8/65* | (2018.01) | |
| *B64D 11/06* | (2006.01) | |
| *D03D 1/00* | (2006.01) | |
| *G06F 21/34* | (2013.01) | |
| *H04L 29/12* | (2006.01) | |
| *B64D 45/00* | (2006.01) | |

(52) U.S. Cl.
CPC ........... *B64D 45/00* (2013.01); *D03D 1/0088* (2013.01); *G06F 8/61* (2013.01); *G06F 8/65* (2013.01); *G06F 8/71* (2013.01); *G06F 21/34* (2013.01); *H04L 61/2007* (2013.01); *H04L 67/12* (2013.01); *H04L 67/125* (2013.01); *B64D 2045/007* (2013.01)

(58) Field of Classification Search
CPC ............... B64D 11/0015; B64D 45/00; B64D 2045/007; D03D 1/0088; H04L 61/2007; H04L 67/12; H04L 67/125
See application file for complete search history.

(56) References Cited

U.S. PATENT DOCUMENTS

| | | | |
|---|---|---|---|
| 9,092,288 B2* | 7/2015 | Nagai | G06F 8/61 |
| 9,187,642 B2 | 11/2015 | Gaydoul et al. | |
| 9,440,599 B2 | 9/2016 | Heyden et al. | |
| 9,965,931 B2* | 5/2018 | Reinbold | H04N 21/2146 |
| 10,233,571 B1* | 3/2019 | Alexander | D03D 1/0088 |
| 10,298,492 B2* | 5/2019 | Kim | H04L 45/72 |
| 10,482,752 B2* | 11/2019 | Griffiths | B60N 5/00 |
| 10,765,325 B2* | 9/2020 | Berkey | A61B 5/14532 |
| 2001/0002814 A1* | 6/2001 | Suganuma | G06F 21/313 |
| | | | 340/5.74 |
| 2002/0070591 A1* | 6/2002 | Nivet | B64D 11/00155 |
| | | | 297/217.3 |
| 2003/0224155 A1 | 12/2003 | Orth et al. | |
| 2007/0100513 A1* | 5/2007 | Asano | G08G 1/0104 |
| | | | 701/2 |
| 2007/0197115 A1 | 8/2007 | Eves et al. | |
| 2008/0316580 A1 | 12/2008 | Gillies et al. | |
| 2009/0119657 A1* | 5/2009 | Link, II | G06F 8/65 |
| | | | 717/171 |
| 2011/0144858 A1* | 6/2011 | Yun | H04L 12/40006 |
| | | | 701/31.4 |
| 2011/0307882 A1* | 12/2011 | Shiba | G06F 8/65 |
| | | | 717/173 |
| 2011/0320089 A1 | 12/2011 | Lewis | |
| 2013/0117338 A1 | 5/2013 | Lynch et al. | |
| 2013/0261881 A1* | 10/2013 | Scheid | G06F 7/00 |
| | | | 701/32.6 |
| 2013/0338857 A1* | 12/2013 | Sampigethaya | G06F 19/3418 |
| | | | 701/3 |
| 2014/0125355 A1* | 5/2014 | Grant | G01R 27/2605 |
| | | | 324/629 |
| 2014/0207535 A1* | 7/2014 | Stefan | G07C 5/008 |
| | | | 705/7.42 |
| 2016/0098259 A1 | 4/2016 | Mitchell | |
| 2016/0173530 A1* | 6/2016 | Miyake | H04L 67/12 |
| | | | 726/3 |
| 2017/0024201 A1* | 1/2017 | Diedrich | H04L 67/34 |
| 2017/0212746 A1* | 7/2017 | Quin | H04L 67/12 |
| 2018/0018160 A1* | 1/2018 | Teraoka | G06F 11/00 |
| 2018/0152341 A1* | 5/2018 | Maeda | G06F 11/00 |
| 2019/0187291 A1* | 6/2019 | Troia | G06F 21/572 |
| 2019/0250900 A1* | 8/2019 | Troia | H04W 4/50 |
| 2019/0315293 A1* | 10/2019 | Arai | F02D 29/02 |
| 2019/0361696 A1* | 11/2019 | Nakano | G06F 8/654 |
| 2020/0058210 A1* | 2/2020 | Williams | G08B 21/24 |
| 2020/0094985 A1 | 3/2020 | Quatmann et al. | |

FOREIGN PATENT DOCUMENTS

| | | |
|---|---|---|
| DE | 10 2012 013 550 A2 | 1/2013 |
| DE | 20 2012 011 759 U1 | 2/2013 |
| DE | 10 2016 007 255 A1 | 12/2017 |
| EP | 3546355 A1 | 10/2019 |
| EP | 3560834 A1 | 10/2019 |
| WO | WO 2007/093403 A1 | 8/2007 |

OTHER PUBLICATIONS

European Search Report for Application No. 19159223.7 dated Aug. 14, 2019.
European Search Report for Application No. 19165878.0 dated Oct. 2, 2019.

* cited by examiner

SYSTEMS, METHODS, AND DEVICES FOR CONTROLLING SMART FABRICS IN AIRCRAFT

CROSS-REFERENCE TO RELATED APPLICATION

This application claims priority to U.S. Provisional Patent Application Ser. No. 62/649,888, filed Mar. 29, 2018, the entire disclosure of which is incorporated by reference herein.

TECHNICAL FIELD

The subject matter disclosed herein relates generally to smart fabrics for use in aircraft and other vehicles. More particularly, the subject matter disclosed herein relates to control systems and methods for controlling smart fabrics for aircraft and other vehicles.

BACKGROUND

Long duration flights (and even some short flights), ground transportation trips, and long-term seating can be quite uncomfortable for some passengers and patrons who have to sit in a confined space for an extended period of time. The personal comfort of some passengers can be quite poor depending on their body conditioning, the temperature of the cabin or compartment in which they are seated, and other environmental factors that are beyond their control. Many passengers want the ability to control the comfort and other properties of their seats such that their flights, trips, and other experiences are more enjoyable.

Smart fabrics, also known as electronic textiles, smart garments, smart clothing, or smart textiles are fabrics that enable digital components such as miniature computers, light emitting diodes, sensors, and other electronics to be embedded in them. These fabrics can be configured to modify their physical behavior including changing their color, breathability, stiffness, as well as other properties, depending on the applications for which the fabric is being utilized.

Given their properties and ability to make seats more comfortable, smart fabrics are an ideal addition to aircraft, other vehicle seats, and other structures to improve passenger comfort and the overall enjoyment of the trip. With that being said, there is a need for an efficient solution for controlling the smart fabrics, whether they be attached to structures in aircraft, spacecraft, ground vehicles, or non-vehicles.

SUMMARY

In accordance with this disclosure, systems, methods, and devices are provided for efficiently controlling smart fabrics in aircraft and other vehicles. In an embodiment, a system for controlling one or more smart fabrics in a vehicle is provided, the system comprising: one or more vehicle structures inside a cabin of the vehicle; at least one of the vehicle structures comprising smart fabric; one or more smart fabric controllers, wherein the smart fabric controllers are configured to control one or more smart fabric; at least one vehicle controller onboard the vehicle in communication with each of the one or more smart fabric controllers and configured to provide at least an electronic update of the smart fabric controllers; and at least one main controller outside the vehicle and in communication with the at least one vehicle controller onboard the vehicle, wherein each of the one or more smart fabric controllers is in communication with the smart fabric of one or more respective vehicle structures; and wherein each of the one or more smart fabric controllers is configured to control one or more properties of the smart fabric of the one or more respective vehicle structures, based, at least in part, on communication from the at least one vehicle controller or input from a user of the smart fabric of the one or more respective vehicle structure.

In some embodiments, each of the one or more smart fabric controllers further comprises: one or more processors, non-transitory computer readable media, and executable instructions to be executed by the one or more processors; and a first wired or wireless connection to the at least one vehicle controller. In some embodiments of the present disclosure, each of the one or more smart fabric controllers further comprises: one or more second wired or wireless connections to the smart fabric of the one or more respective vehicle structures, wherein each of the one or more smart fabric controllers is configured to provide power to the smart fabric it is configured to control via the one or more second wired or wireless connections; and wherein each of the one or more smart fabric controllers is configured to control the smart fabric of the respective one or more vehicle structure via the one or more second wired or wireless connections.

In some embodiments, the at least one vehicle controller is configured to: receive from each of the one or more smart fabric controllers, via the first wired or wireless connection, one or more electronic messages or electronic signals indicating a current version of firmware loaded on respective smart fabric controllers; compare the current version of firmware installed on each of the one or more smart fabric controllers with an expected version of firmware; send, either automatically or not automatically, the expected version of firmware to any of the one or more smart fabric controllers that do not have the expected version of firmware installed for upgrading; and verify that any of the one or more smart fabric controllers that were sent the expected version of firmware for upgrading were upgraded to the expected version of firmware properly.

In an aspect of the disclosure herein, a method for controlling one or more smart fabrics in vehicles is provided, the method comprising: providing one or more vehicle structures inside a cabin of a vehicle, wherein at least one of the one or more vehicle structures comprises smart fabric; providing one or more smart fabric controllers, wherein the smart fabric controllers are configured to control one or more smart fabric; providing at least an electronic update of one or more of the smart fabric controllers using at least one vehicle controller onboard the vehicle in communication with each of the one or more smart fabric controllers; providing at least one main controller outside the vehicle and in communication with the at least one vehicle controller onboard the vehicle; and controlling properties of the smart fabric of one or more respective vehicle structures via the one or more smart fabric controllers, based, at least in part, on communication from the at least one vehicle controller or input from a user of the smart fabric of the one or more respective vehicle structures.

Although some aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

BRIEF DESCRIPTION OF THE DRAWINGS

Features and advantages of the present subject matter will be more readily understood from the following detailed description which should be read in conjunction with the accompanying, example drawings that are given merely by way of explanatory and non-limiting example, and in which.

DETAILED DESCRIPTION

Figure 1A:
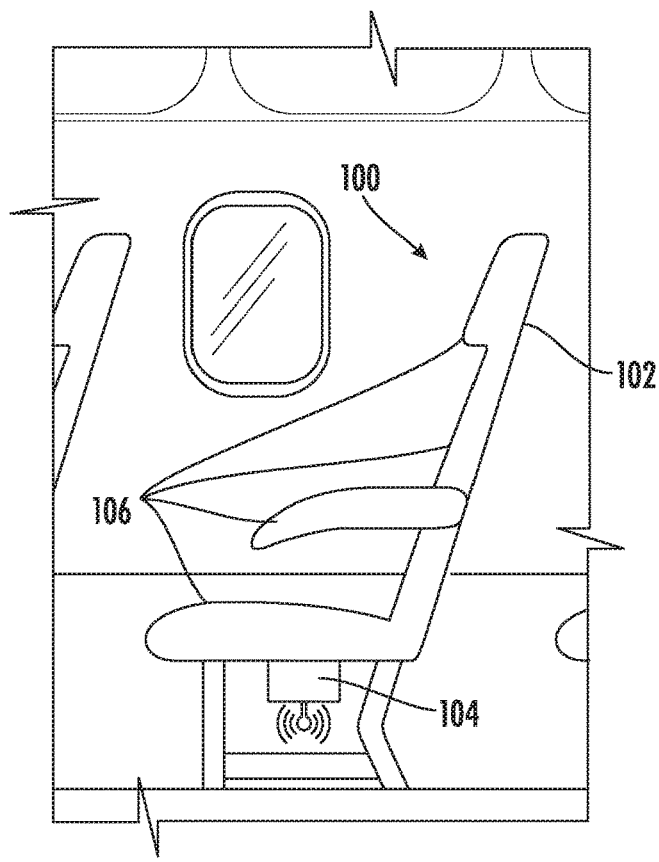
FIG. 1A illustrates a side view of an aircraft structure as or in a form of a seat with smart fabric and a smart fabric controller attached to a bottom of the aircraft structure.

The subject matter herein can be embodied in other forms without departure from the spirit and essential characteristics thereof. The embodiments described therefore are to be considered in all respects as illustrative and not restrictive. Although the present subject matter has been described in terms of certain embodiments, other embodiments that are apparent to those of ordinary skill in the art are also within the scope of the present subject matter.

Unless otherwise defined, terms used herein should be construed to have the same meaning as commonly understood by one of ordinary skill in the art to which this subject matter belongs. It will be further understood that terms used herein should be interpreted as having a meaning that is consistent with the respective meaning in the context of this specification and the relevant art and should not be interpreted in an idealized or overly formal sense unless expressly so defined herein.

Some aspects of the subject matter are described herein with reference to side view illustrations that are graphical illustrations of example aspects of the subject matter. Variations from the shapes of the illustrations as a result, for example, of manufacturing techniques and/or tolerances, are to be expected, such that aspects of the subject matter should not be construed as limited to particular shapes illustrated herein. This subject matter can be embodied in different forms and should not be construed as limited to the specific aspects or embodiments set forth herein. In the drawings, the size and relative sizes of different objects can be exaggerated for clarity.

Unless the absence of one or more elements is specifically recited, the terms "comprising", "including", and "having" as used herein should be interpreted as open-ended terms that do not preclude the presence of one or more elements. Additionally, like numbers refer to like elements throughout this description.

In an aspect of the present disclosure, systems and methods for controlling smart fabrics are provided. Although the description herein uses aircraft as an example vehicle for which the present subject matter can be used, those of ordinary skill in the art will appreciate that the concepts and embodiments described herein can be tailored to any type vehicle transporting humans or animals or any non-vehicle where humans or animals or other, non-living things can be seated, lay down, lean against, or otherwise interact with structures that include smart fabrics. For example and without limitation, a vehicle could be an automobile, truck, train, boat, ferry, ship, cruise ship, spacecraft, bus, trolley, tram, rail car, military vehicle, ground transport vehicle, air transport vehicle, sea transport vehicle, space transport vehicle, underground transport vehicle or any other suitable vehicle. In addition, those of ordinary skill in the art will appreciate that the concepts and embodiments described herein can be tailored to non-vehicles such as household beds, hotels and hospitals with beds and chairs, colleges, schools, and universities with classroom seating, theaters with one or more seats, benches, or chairs, sports venues, and other places where humans or animals will be seated, laying down, leaning against, or otherwise interacting with non-vehicle structures with smart fabrics attached to them.

Smart fabrics, also known as electronic textiles, smart garments, smart clothing, or smart textiles are fabrics that enable digital components such as miniature computers, light emitting diodes, sensors, motors, and other electronics to be embedded in them. These fabrics can be configured to modify their physical behavior and properties including changing their color, breathability, stiffness, as well as other properties, depending on the applications the fabric is being utilized for. The sensors embedded in the fabric are configured to listen, detect loads, detect temperature, they can store and release energy, or even store and release liquid. In recent years, smart fabrics have become more prevalent in manufacturing fields including the manufacture of aircraft. Their purpose in this context is to improve the flight conditions and the personal comfort of passengers who make use of airplane seats and beds with smart fabrics installed. In some cases, smart fabrics can help to alleviate jet-lag, reduce discomfort and stiffness in passengers, and even detect medical conditions that might be otherwise unnoticeable.

Contemporary smart fabrics are mostly affixed to the aircraft seats and beds with hook and loop type fastens or other like substances, which allows for quick removal of the seat dress cover to exchange with another cover in the event that there is damage or spills on the current cover. Additionally, more control over the smart fabrics is needed for future applications.

FIG. 1A is a side view of a smart fabric assembly, generally designated 100, comprising an aircraft structure 102 with a smart fabric 106 affixed to it as well as a smart fabric controller 104. In some embodiments of the present disclosure, as described herein, an aircraft structure 102 can be any structure inside the aircraft fuselage, or otherwise inside the aircraft, that is suitable for a human or animal to lay, sit, sleep, stand, lean, or rest on or any structure suitable for applying a fabric to that a human or animal passenger might interact with, directly or indirectly. For example and without limitation, as shown in FIG. 1A, the aircraft structure 102 comprises an aircraft seat. However, in some embodiments, the aircraft structure 102 can comprise an aircraft bed, an aircraft cot, an aircraft bench, an aircraft stool, and/or an aircraft toilet. In some embodiments, the smart fabric 106 may be affixed to the aircraft structure 102 using hook and loop type fasteners or any other appropriate material that will easily allow the smart fabric 106 to be taken off and replaced as needed. As will be appreciated by those of ordinary skill in the art, the smart fabric 106 can be shaped, configured, positioned, or otherwise altered to be any shape, design, or size, based on the aircraft structure 102 and smart fabric 106 is being applied to.

Additionally, the smart fabric controller 104 is configured to control the smart fabric 106, including manipulating and/or changing one or more of the properties of the smart fabric 106. For example and without limitation, the smart fabric controller 104 is configured to control and/or manipulate the digital components such as miniature computers, LEDs, sensors, motors, and other electronics embedded in the smart fabrics 106. Moreover, the smart fabric controller 104 can be configured to manipulate and/or control the physical behavior and other properties of the smart fabrics 106, including, for example and without limitation, changing their color, breathability, stiffness, as well as other properties, depending on the applications the fabric is being utilized for. Also, the smart fabric controller 104 can be configured to manipulate, control, and/or communicate with sensors embedded in the fabric, the sensors being configured to listen, detect loads, detect temperature, they can store and release energy, or even store and release liquid. As described further hereinbelow, the smart fabric controller 104 can be configured to manipulate and/or control the smart fabric 106 attached to one or more aircraft structures 102. Also, the smart fabric controller 104 can be configured to communicate with, control, manipulate, and/or change the smart fabric(s) 106 it is configured to control based on communications from a vehicle or aircraft controller and/or a user input device.

The aircraft structure 102 is affixed inside the fuselage just as any other seat, bed, chair, etc. would be in an aircraft. FIG. 1A is an example of just one aircraft structure 102, however, as is usually the case, in some embodiments of the present disclosure, there are one or more aircraft structures 102 inside the fuselage with a similar or identical shape, size, and/or design. Those of ordinary skill in the art will appreciate that the aircraft can alternatively be equipped with one or more aircraft beds and/or one or more aircraft seats and/or one or more aircraft benches, each being considered an aircraft structure 102. The present subject contemplates an aircraft with any combination or number of aircraft structures 102.

The smart fabric 106 can be affixed to any suitable portion of the aircraft seat or other aircraft structure 102. For example and without limitation, in the case of the aircraft structure 102 being an aircraft seat, the smart fabric 106 can be affixed to the bottom or other suitable portion or location of the aircraft seat, where a passenger would sit, a back portion of the aircraft seat, where a passenger's back would rest, a head rest portion, and/or an armrest portion of the aircraft seat. Likewise, if the aircraft structure 102 is an aircraft bed, the smart fabric 106 can be affixed to the aircraft bed, for example, on the laying portion of the aircraft bed, as well as pillows and/or head rest portions as well. Those of ordinary skill in the art will appreciate that the smart fabric 106 can be affixed in many suitable locations on the aircraft structures 102, including, but not limited to, any portion of the aircraft structure 102 where a human or animal will physically interact with, get close to, and/or touch.

In some embodiments of the present disclosure, each aircraft structure 102 can include one or more smart fabric controllers 104. In the embodiment shown in FIG. 1A, the aircraft structure 102, an aircraft seat, includes a smart fabric controller 104 attached to the bottom of the seat or otherwise disposed below the seat. In some embodiments, the smart fabric controller 104 can be attached to the back of the seat, inside the arm rest of the seat or other suitable place.

As described above, in some embodiments, the smart fabric 106, also known as electronic textiles, smart garments, smart clothing, or smart textiles are fabrics that enable digital components such as miniature computers, light emitting diodes, sensors, and other electronics to be embedded in them. These fabrics can be configured to modify their physical behavior including changing their color, breathability, stiffness, as well as other properties, depending on the applications the fabric is being utilized for. The sensors embedded in the fabric are configured to listen, detect loads, detect temperature, they can store and release energy, or even store and release liquid. In some embodiments, the smart fabric controller 104 is configured to control the smart fabric 106 in at least some of the ways described above. As described hereinbelow, in some embodiments, the smart fabric controller 104 has a wired or wireless connection to the smart fabric 106 and is configured to send instructions via the connection to the smart fabric 106 to perform some of the functions described above. In some embodiments, the smart fabric controller 104 can be embedded within an aircraft structure 102. For example and without limitation, a smart fabric controller 104 can be embedded within and aircraft seat such as within the cushions or other structure that makes up the seat.

Figure 1B:
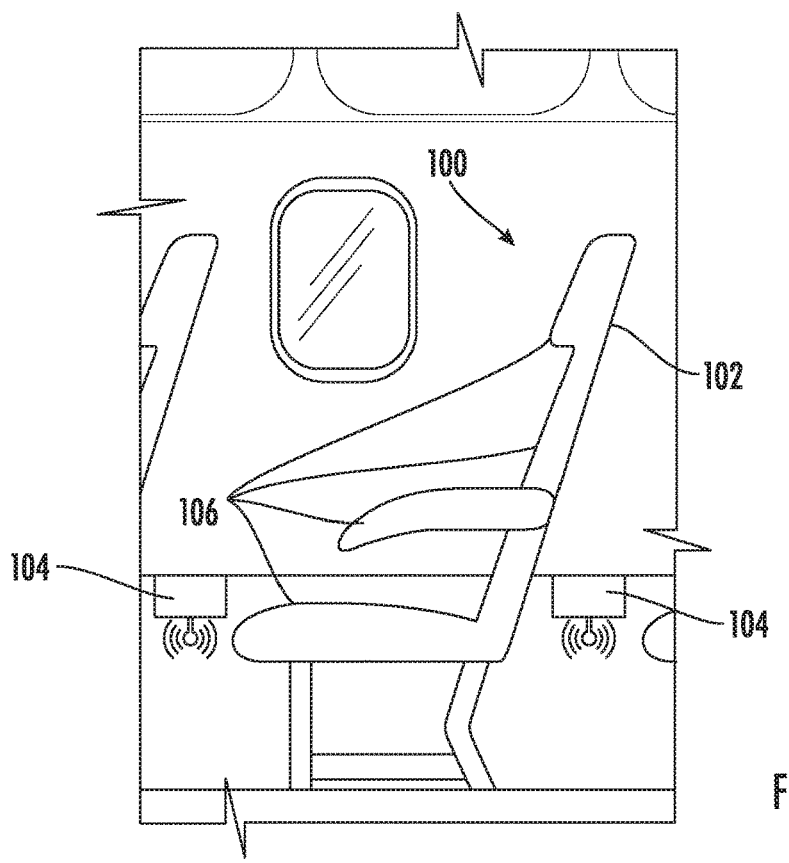
FIG. 1B illustrates a side-view of an aircraft structure as or in a form of a seat with smart fabric and a smart fabric controller attached to an aircraft wall beside the aircraft structure.

FIG. 1B illustrates that in some embodiments, the smart fabric assembly 100 can comprise an aircraft structure 102, such as the single aircraft seat depicted, comprising smart fabric 106. Furthermore, in some embodiments, the smart fabric controller 104 can be attached to an aircraft side wall, for example a wall that is or is next to the aircraft fuselage wall, next to the aircraft structure 102. In some embodiments, the smart fabric controller 104 can be stored inside the wall of the fuselage, outside the wall, or even on/in the roof of the fuselage above or around the aircraft structure 102. In some embodiments, as depicted in FIG. 1B, the smart fabric controller 104 can be attached to the floor of the aircraft fuselage where passengers walk, stand, or otherwise place their feet, luggage, or carry-ons.

Figure 1C:
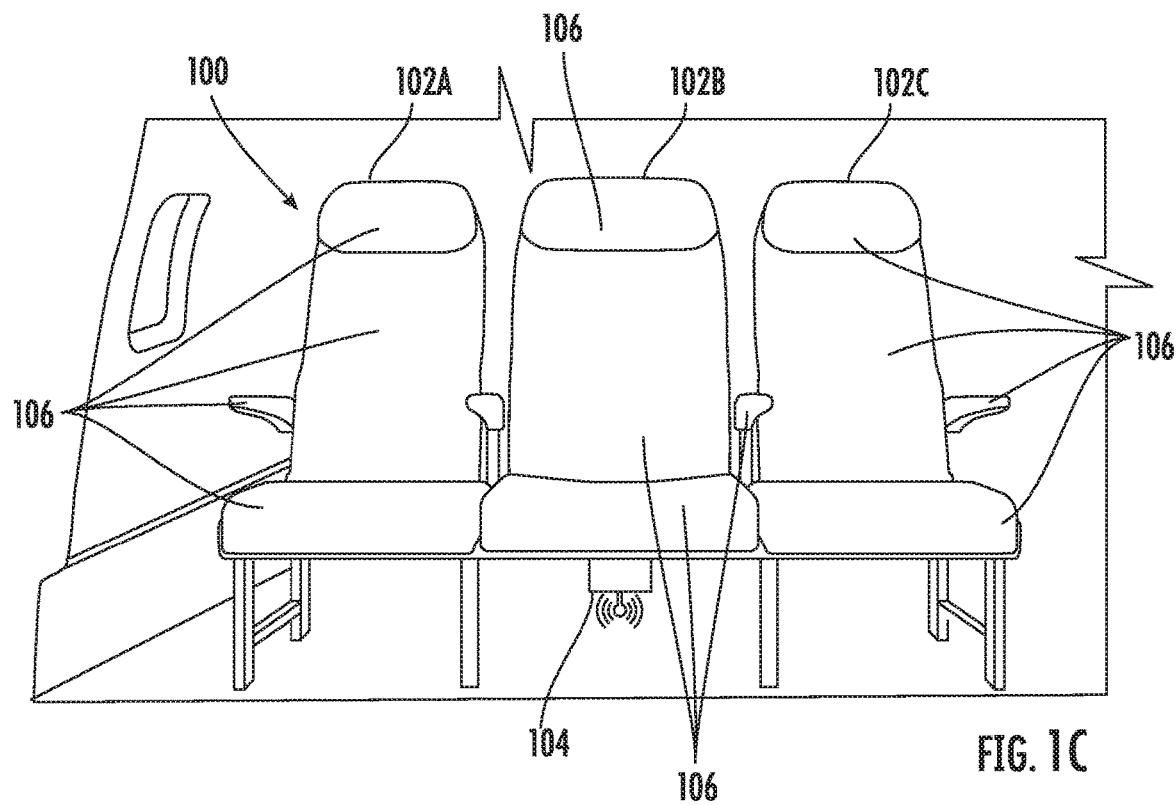
FIG. 1C illustrates a front view of three aircraft structures as seats in a row with a single smart fabric controller attached to a bottom of the middle seat aircraft structure.

Those of ordinary skill in the art will appreciate that smart fabric controllers 104 can be configured to control the smart fabric 106 of one or more aircraft structures 102. For example and without limitation, a single smart fabric controller 104 can be attached to a first aircraft structure 102 and the single smart fabric controller 104 can be configured to control the smart fabric 106 attached to the first aircraft structure 102 that it is attached to. In some embodiments, the single smart fabric controller 104 can also be configured to control the smart fabric 106 attached to the aircraft structures 102 surrounding it. The same can be said for a smart fabric controller 104 that is attached to or embedded inside of the fuselage wall, attached to the ground of the fuselage, or the roof of the fuselage. FIG. 1C below depicts an example of a single smart fabric controller 104 attached to a first aircraft structure with multiple other aircraft structures around it.

FIG. 1C illustrates a front view of a row of three aircraft structures 102, namely first aircraft structure 102A, second aircraft structure 102B, and third aircraft structure 102C. As described above, the three aircraft structures 102 in this depiction are aircraft seats. FIG. 1C depicts the middle aircraft seat, second aircraft structure 102B, with a single smart fabric controller 104 attached to the bottom of it. In this embodiment, the smart fabric controller 104 can be configured to control just the smart fabric 106 of second aircraft structure 102B, or any combination or all of first aircraft structure 102A, second aircraft structure 102B, and/or third aircraft structure 102C. In other words, the smart fabric controller 104 can be configured to control one or more smart fabric 106. In some embodiments, for example and without limitation, a single smart fabric controller 104 can be configured to control an entire row of aircraft seats with smart fabric 106 attached to them.

The smart fabric controller 104 can be configured to have multiple connections, at least one between the smart fabric controller 104 and each of the first aircraft structure 102A, second aircraft structure 102B, and/or third aircraft structure 102C. Through these wired or wireless connections between each of the smart fabric controller 104 and the smart fabrics 106 that the smart fabric controller 104 is configured to control, the smart fabric controller 104 can be configured to change the properties of the smart fabrics 106 as described herein. In some embodiments, for example and without limitation, the smart fabric controller 104 can be configured to alter the smart fabrics 106 attached to each of the first aircraft structure 102A, second aircraft structure 102B, and/or third aircraft structure 102C simultaneously or at separate times. Additionally, the smart fabric controller 104 can be configured to alter the properties of the smart fabrics attached to each of the first aircraft structure 102A, second aircraft structure 102B, and/or third aircraft structure 102C the same way (e.g., identical changes to the properties of the smart fabrics 106). Or the smart fabric controller 104 can be configured to customize the properties of each smart fabric 106 for each of the first aircraft structure 102A, second aircraft structure 102B, and/or third aircraft structure 102C in a customized and separate way.

Figure 1D:
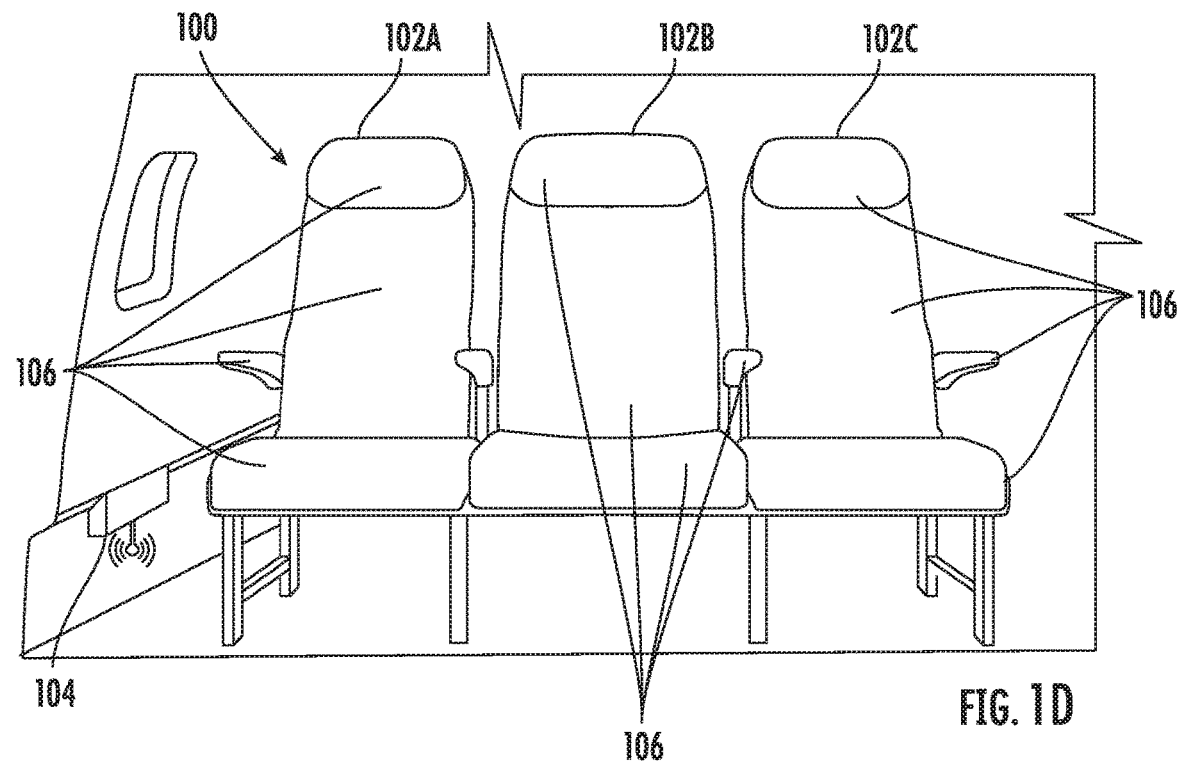
FIG. 1D illustrates a front view of three aircraft structures as seats in a row with a single smart fabric controller attached to an aircraft side-wall beside the far left aircraft structure.

FIG. 1D illustrates a similar front view of a row of three aircraft structures 102 as FIG. 1C above. Except, as shown in the figure, the smart fabric controller 104 is affixed to the side-wall of the fuselage, beside the first aircraft structure 102A. As with the embodiment described in FIG. 1C, the smart fabric controller 104 can be configured to control the smart fabric 106 attached to any or all of first aircraft structure 102A, second aircraft structure 102B, and/or third aircraft structure 102C.

Figure 1E:
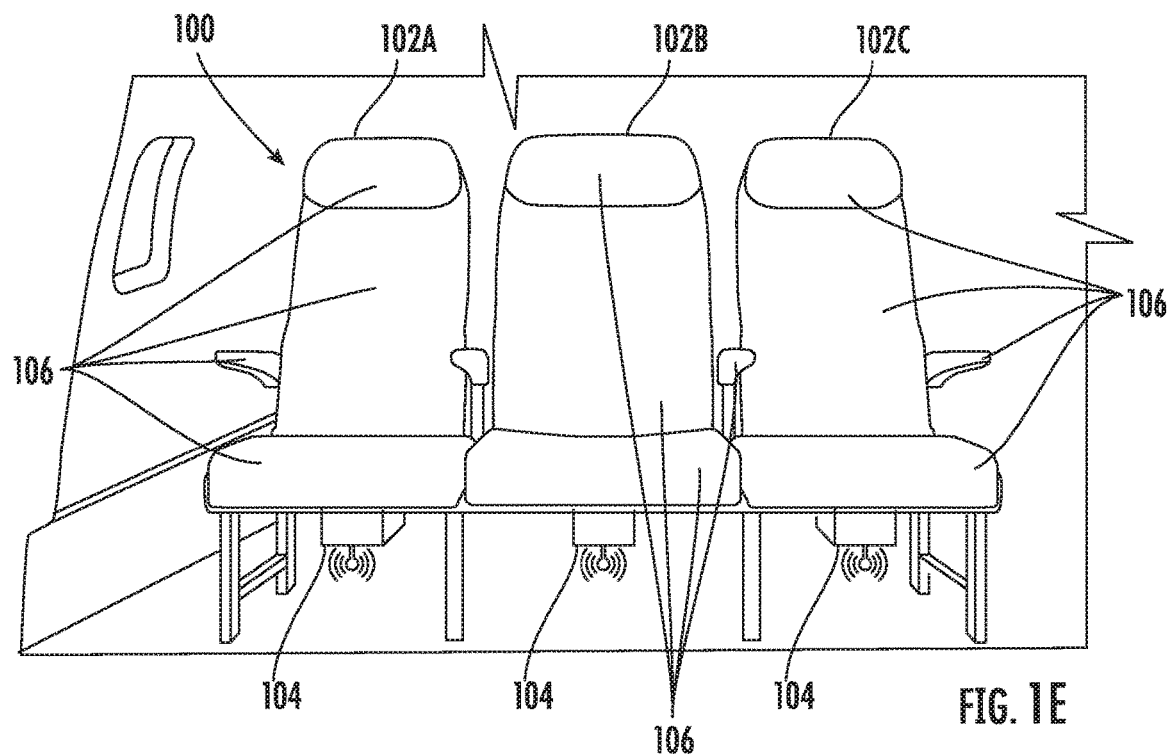
FIG. 1E illustrates a front view of three aircraft structures as seats in a row with three smart fabric controllers attached to bottoms of each of the three seat aircraft structures.

FIG. 1E illustrates a similar front view of a row of three aircraft structures 102 as FIGS. 1C and 1D depict. However, as shown in FIG. 1E, each of first aircraft structure 102A, second aircraft structure 102B, and third aircraft structure 102C comprise a smart fabric controller 104 attached to the bottom, or other suitable area, of the aircraft structure 102. This further illustrates that, for example and without limitation, in some embodiments, the smart fabric controller 104 is configured to control only the smart fabric 106 attached to the aircraft structure 102 that the smart fabric controller 104 is also attached to. However, as described above, one or more smart fabric controllers 104 can be used to control the smart fabric 106 attached to one or more aircraft structures 102.

Figure 1F:
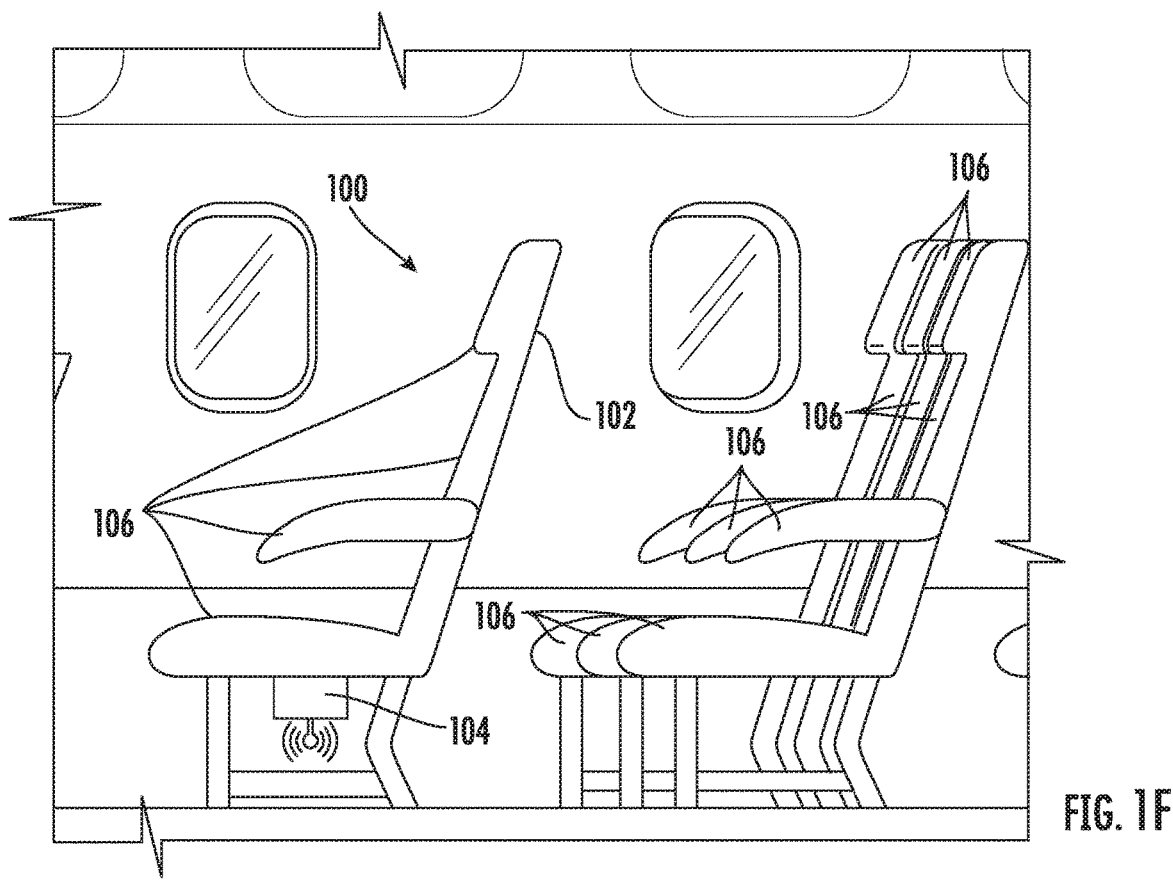
FIG. 1F illustrates a side view of four aircraft structures as seats in two rows, at least one in the front row and three, for example, in the back row, with a single smart fabric controller attached to a bottom of the front seat aircraft structure.

FIG. 1F illustrates two rows of aircraft structures. In the front row there is a single aircraft structure, namely fourth aircraft structure 102D, like that shown in FIG. 1A or 1B. In the back row, there are three aircraft structures, namely first aircraft structure 102A, second aircraft structure 102B, and third aircraft structure 102C, like that shown in FIGS. 1C through 1E. In the illustration depicted in FIG. 1F, only one of the four aircraft structures has a smart fabric controller 104 attached to it, namely, fourth aircraft structure 102D. In this embodiment, the smart fabric controller 104 is configured to control the smart fabric 106 attached to any or all of first aircraft structure 102A, second aircraft structure 102B, third aircraft structure 102C, and/or fourth aircraft structure 102D.

Figure 1G:
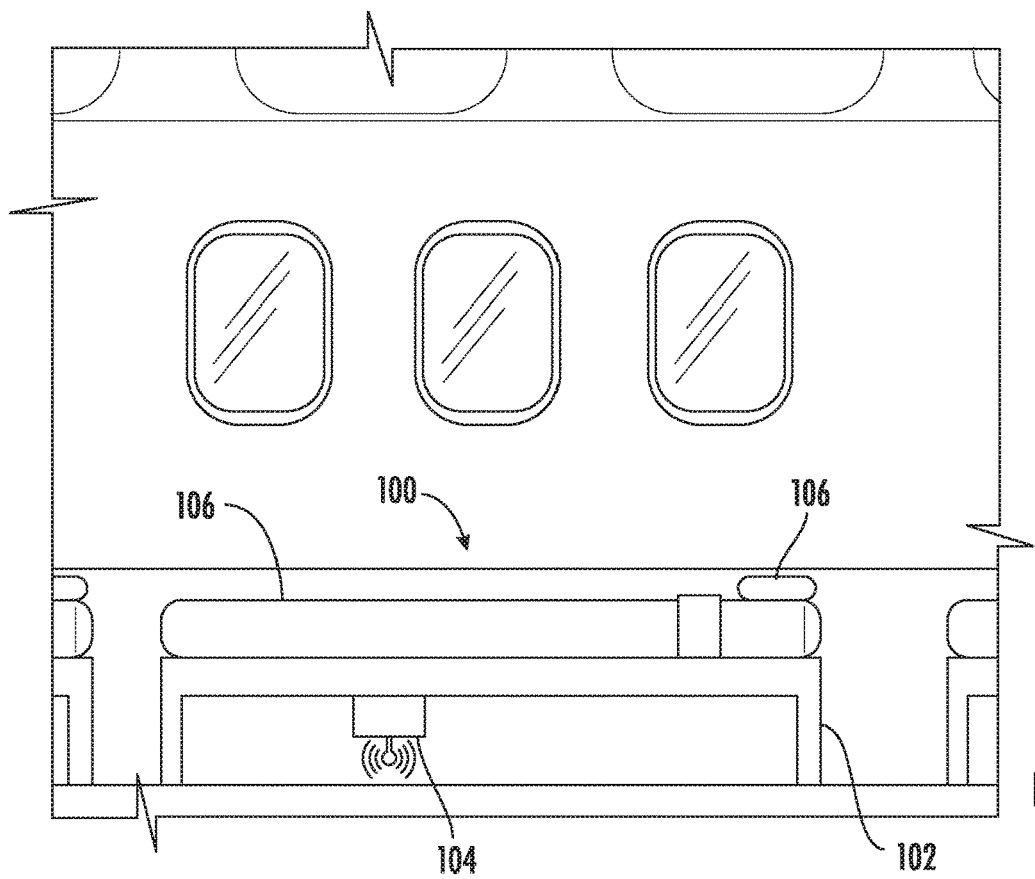
FIG. 1G illustrates an aircraft structure as a bed comprising a single smart fabric controller.

FIG. 1G illustrates an aircraft structure 102 comprising an aircraft bed. In some embodiments, for example and without limitation, when the aircraft structure 102 is an aircraft bed, the smart fabric 106 can comprise or be included in any or all of bed sheets, a comforter, a pillow, pillow case, a sham, a fitted sheet, or a blanket that is on or a part of the bed. In some embodiments, for example and without limitation, when the aircraft structure 102 is an aircraft bed, the smart fabric controller 104 can be affixed to any portion of the bed, beside the bed, on the fuselage wall beside the bed, on the roof of the fuselage just above the bed, or any suitable area near the bed such that the smart fabric controller 104 can electronically communicate with the smart fabric 106 in, on, or around the bed.

Figure 1H:
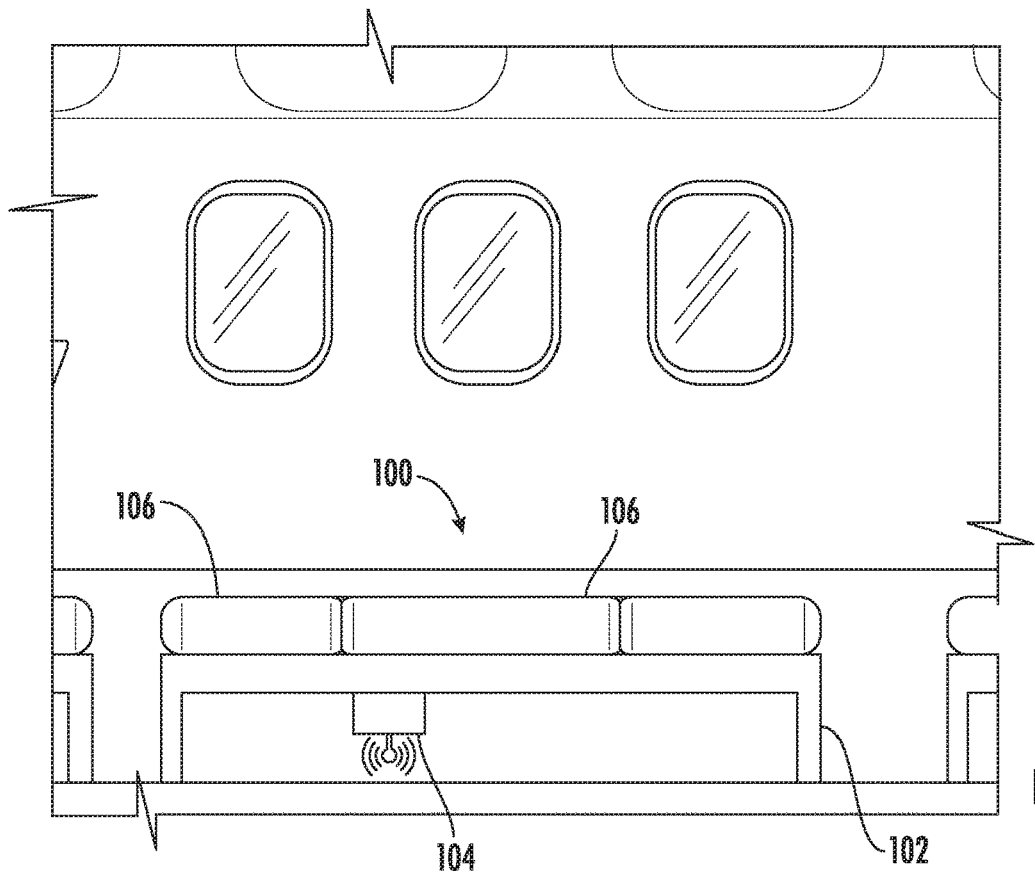
FIG. 1H illustrates an aircraft structure as a bench comprising a single smart fabric controller attached to a bottom of the bench.

FIG. 1H illustrates an aircraft structure 102 comprising an aircraft bench. In some embodiments, for example and without limitation, when the aircraft structure 102 is an aircraft bench, the smart fabric controller 104 can be affixed to the bottom or other suitable portion or location of the bench or on the wall or any other position as described above similar to when the aircraft structure is an aircraft seat.

Figure 1I:
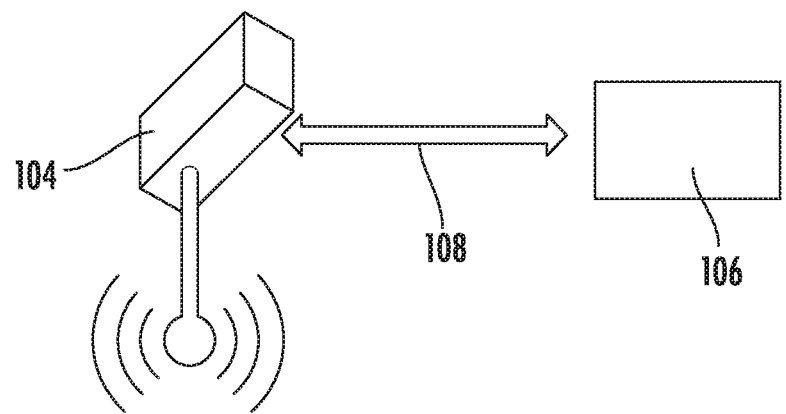
FIG. 1I illustrates a smart fabric controller in communication with a smart fabric.

FIG. 1I illustrates a smart fabric controller 104 in electronic communication with smart fabric 106. In order to control the smart fabric 106, the smart fabric controller 104 has a communications link 108 with the smart fabric 106, and is configured to send instructions, information, and other data to the smart fabric 106 via the communications link 108. In some embodiments, the smart fabric 106 is also configured to send information and other data back to the smart fabric controller 104 depending on the sensors, processors, or other items embedded in the smart fabric 106. In some embodiments, as described above, the smart fabric controller 104 can comprise a communications link 108 between itself and one or more smart fabrics 106. In some embodiments, the communications link 108 can comprise a suitable wired or wireless connection. For example and without limitation, the wired or wireless connection of the communications link 108 can be a Wi-Fi connection, a Bluetooth connection, an Ethernet connection, infrared wireless connection, wireless microwave or radio connection, USB, Thunderbolt, HDMI, or other suitable wired or wireless connection that is capable of facilitating electronic communication between the smart fabric 106 and the smart fabric controller 104.

In some embodiments, the communications link 108 can comprise a mixture of wired and wireless connections. For example, in some embodiments, the smart fabric controller 104 is configured to provide a voltage or electronic power to various components of the smart fabric 106. In such an example, the communications link 108 is a wired connection comprising a wire to provide power or a voltage to the smart fabric 106. In such an example, the communications link 108 could also comprise a wireless connection as described above wherein instructions and data are passed wirelessly and power is provided via the wired connection. In some embodiments, for example and without limitation, the communications link 108 could comprise a wireless only connection and the smart fabric controller 104 configured to provide power to the smart fabric 106 wirelessly and exchange data with the smart fabric 106 wirelessly as well.

In some embodiments, the communication link 108 is a bidirectional communication link. Additionally, in some embodiments, the smart fabric controller 104 comprises one or more power sources to power itself. The power sources can comprise any suitable source including, for example, batteries, a direct power source from the aircraft, or other suitable source of power. In some embodiments, the smart fabric 106 is configured to provide its own power. For example and without limitation, in some embodiments, the smart fabric 106 comprises batteries, solar panels, or other suitable device to help generate power for the smart fabric 106.

Figure 1J:
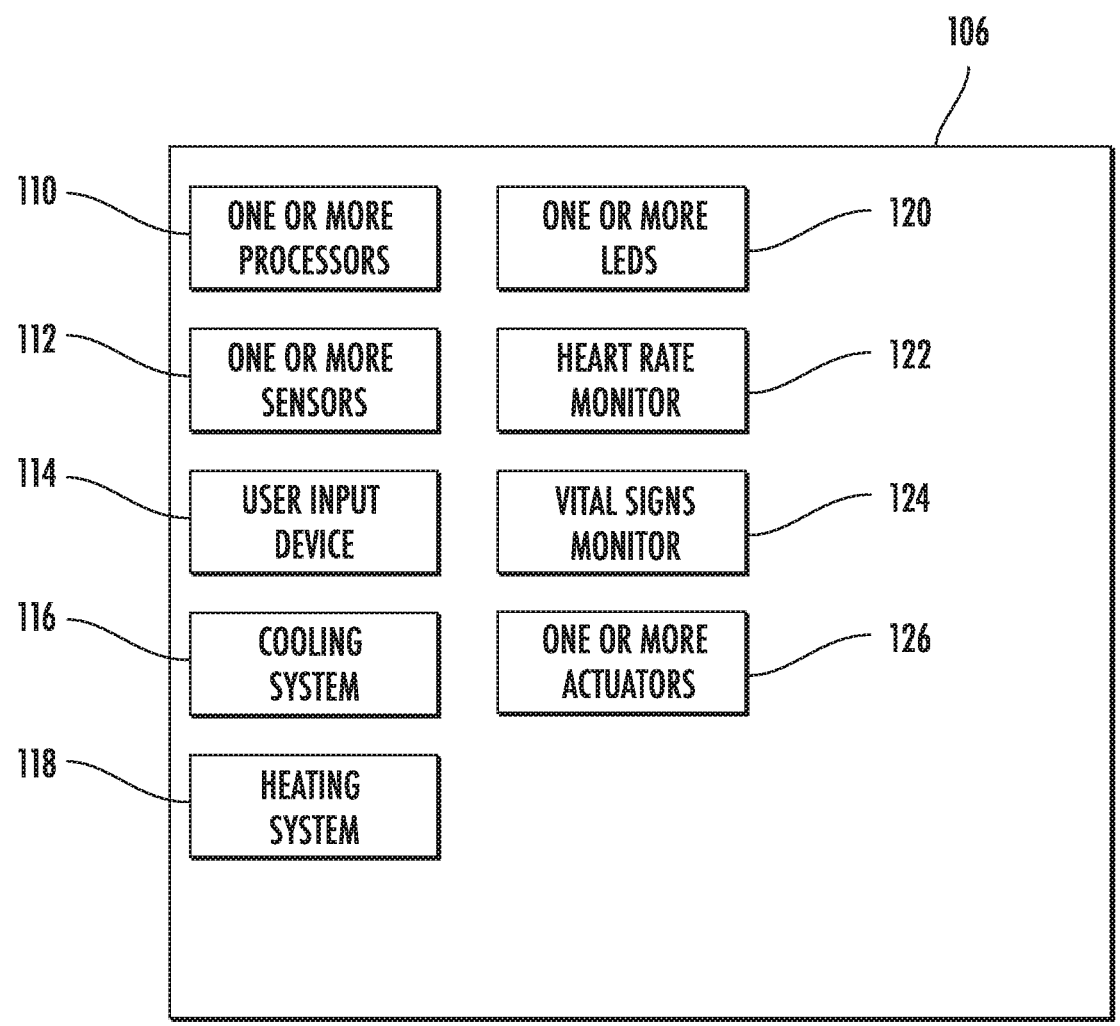
FIG. 1J is a schematic illustration of a smart fabric material including examples of items or components the smart fabric can include.

FIG. 1J illustrates a more detailed diagram of an example smart fabric 106. As described hereinabove, the smart fabric 106 can be any shape suitable for the aircraft structure 102 to which the smart fabric 106 is attached. Furthermore, as described hereinabove, smart fabrics are fabrics that enable digital components such as one or more processors 110, one or more sensors 112, one or more user input devices 114, a cooling system 116, a heating system 118, one or more light emitting diodes (LEDs) 120, a heartrate monitor 122, a vital signs monitor 124, one or more actuators 126, and/or other electronics to be embedded in them. In some embodiments of the present disclosure, the smart fabric controller 104 is configured to send instructions to the smart fabric 106 via the communication link 108 that causes the smart fabric 106 to modify its physical structure, feature or behavior including, for example and without limitation, changing its color, breathability, stiffness, as well as other properties, depending on the applications for which the smart fabric 106 is being utilized.

In some embodiments, for example and without limitation, the sensors embedded in the smart fabric 106 can be configured to listen, detect loads, measure temperature, store and release energy, or even store and release liquid. These data collected by the sensors can be communicated to the smart fabric controller 102. Those of ordinary skill in the art will appreciate that other properties of the smart fabric 106 may also be adjusted based on the instructions given to it by the smart fabric controller 104. Additionally, the data exchanged between the smart fabric 106 and the smart fabric controller 104 can comprise audio recordings or files, sounds detected by the smart fabric 106, load measurements, temperature measurements, energy measurements, or liquid measurements. Those of ordinary skill in the art will also appreciate that the smart fabric 106 can be configured to exchange energy storage and release data as well as liquid storage and release data with the smart fabric controller 104.

Figure 1K:
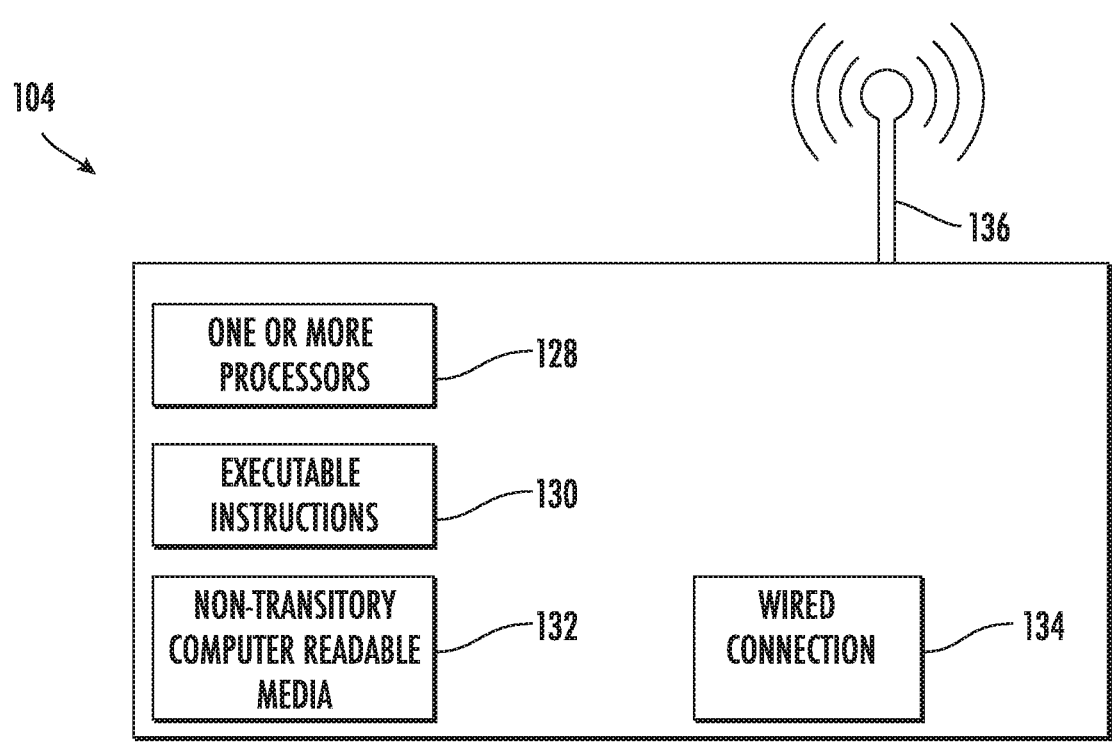
FIG. 1K is a schematic illustration of a smart fabric controller including examples of items the smart fabric controller can include.

FIG. 1K illustrates a more detailed version of the smart fabric controller generally designated 104. In some embodiments, the smart fabric controller 104 can comprise a wireless connection 136, one or more smart fabric controller processors 128, executable instructions 130, one or more non-transitory computer readable media 132, and/or a wired connection 134.

Figure 2:
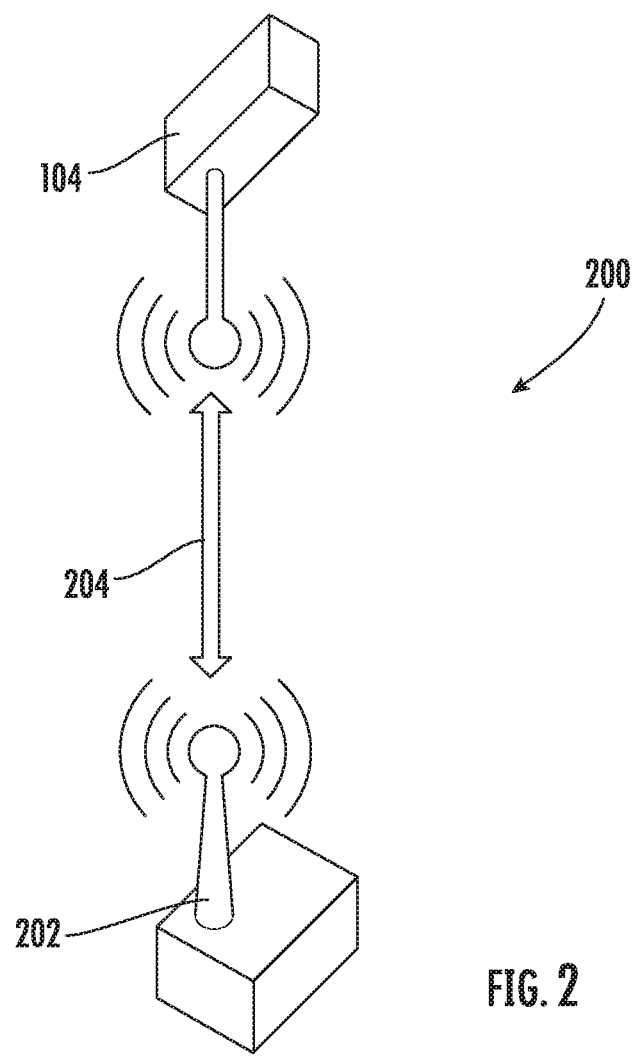
FIG. 2 illustrates a topology diagram of a communication network created between a smart fabric controller and an aircraft controller onboard an aircraft.

FIG. 2 illustrates an example of a network diagram of an aircraft network, generally designated 200, comprising at least one smart fabric controller 104 in communication with a vehicle controller, such as aircraft controller 202, via connection 204. Although in these figures, aircraft controller 202 is depicted, those of ordinary skill in the art will appreciate that the aircraft controller 202 can be a controller for any vehicle on which it is positioned, such as a train controller, car controller, or any of the other vehicles described herein. In some embodiments of the present disclosure, the aircraft controller 202 is in electronic communication with every one of the at least one smart fabric controllers 104 via either a wired or wireless connection 204. In some embodiments of the present disclosure the aircraft network 200 can comprise one or more aircraft controllers 202, each in electronic communication with one or more smart fabric controllers 104. In some embodiments of the present disclosure, each of the one or more aircraft controllers 202 can be configured to provide at least electronic updates of the smart fabric controllers 104. For example and without limitation, the electronic update can be a software update, firmware update, network configuration update (e.g., update internet protocol (IP) addresses), or other electronic update known to those of ordinary skill in the art.

In some embodiments of the present disclosure, the aircraft controller 202 can be located in a centralized location in the fuselage of the aircraft so as to promote better wireless communication with smart fabric controllers 104 in the back of the aircraft. Alternative embodiments may position the aircraft controller 202 in the cockpit of the aircraft in order to promote an easy access to the device, if necessary. In some embodiments, the connection 204 is a wired or wireless connection. For example and without limitation, the wired or wireless connection(s) 204 between the aircraft controller 202 and the one or more smart fabric controller 104 can be a Wi-Fi connection, a Bluetooth connection, an Ethernet connection, infrared wireless connection, wireless microwave or radio connection, USB, Thunderbolt, HDMI, or other suitable wired or wireless connection that is capable of facilitating electronic communication between the smart fabric controllers 104 and the aircraft controller 202.

Furthermore, in some embodiments, the at least one aircraft controller 202 can comprise, for example, one or more processors, computer readable media, executable instructions, wired or wireless connections for electronic communication, a power supply, batteries, and any other suitable electronic known to those of ordinary skill in the art to aid in communicating with the smart fabric controllers.

In some embodiments of the present disclosure, a passenger can adjust the properties of the smart fabric 106 using any suitable device such as the user input device 114 associated with the smart fabric 106 attached to the aircraft structure 102 the passenger is seated/laying on. In some embodiments, the user input device 114 can be, for example and without limitation, a touch screen mobile device, a mobile application on the passenger's cell phone, a tablet PC, a remote control, or other suitable device capable of controlling the smart fabric 116. In some embodiments, the smart fabric 106 properties can be automatically adjusted based on communications between the aircraft controller 202 and the smart fabric controller 104. Alternatively, the aircraft controller 202 can be configured to transmit instructions to one or more of the smart fabric controllers 104 aboard the aircraft to manipulate the properties of the smart fabrics 106. For example and without limitation, in some embodiments of the present disclosure, a pilot, flight attendant, or other staff member of the aircraft can select a setting on the aircraft controller 202 or transmit a signal to the aircraft controller 202 causing it to instruct one or more of the smart fabric controllers 104 to position the aircraft structures 102 in a particular way. For example and without limitation, in some embodiments, the aircraft controller 202 can be configured to instruct one or more of the smart fabric controllers 104 to return one or more of the smart fabrics 106 to default settings or any other common setting at any point during the flight, after a flight has landed, or after the passengers have exited the plane and new passengers are preparing to board the plane.

In another embodiment of the present disclosure, the aircraft controller 202 is configured to ensure that the smart fabric controllers 104 on the aircraft are all executing the expected version of firmware. If any of the smart fabric controllers 104 is not running the expected version of firmware, the aircraft controller 202 can be configured to send an updated firmware package to the smart fabric controller 104. The firmware update process is depicted more thoroughly below in the discussion of FIGS. 4A through 4G.

Those of ordinary skill in the art will appreciate that the aircraft controller 202 can either be a separate and distinct device from the remainder of the aircraft equipment, or can be integrated into the normal cockpit equipment, including for example, the aircraft computer. In some embodiments of the present disclosure, the aircraft controller 202 can be integrated into the controls of the aircraft such that the pilot, co-pilot, or some other appropriate user can operate it as is needed. In some other embodiments, the aircraft controller 202 can itself be integrated into a panel inside the fuselage, but available for flight attendants to manage and control.

Figure 3A:
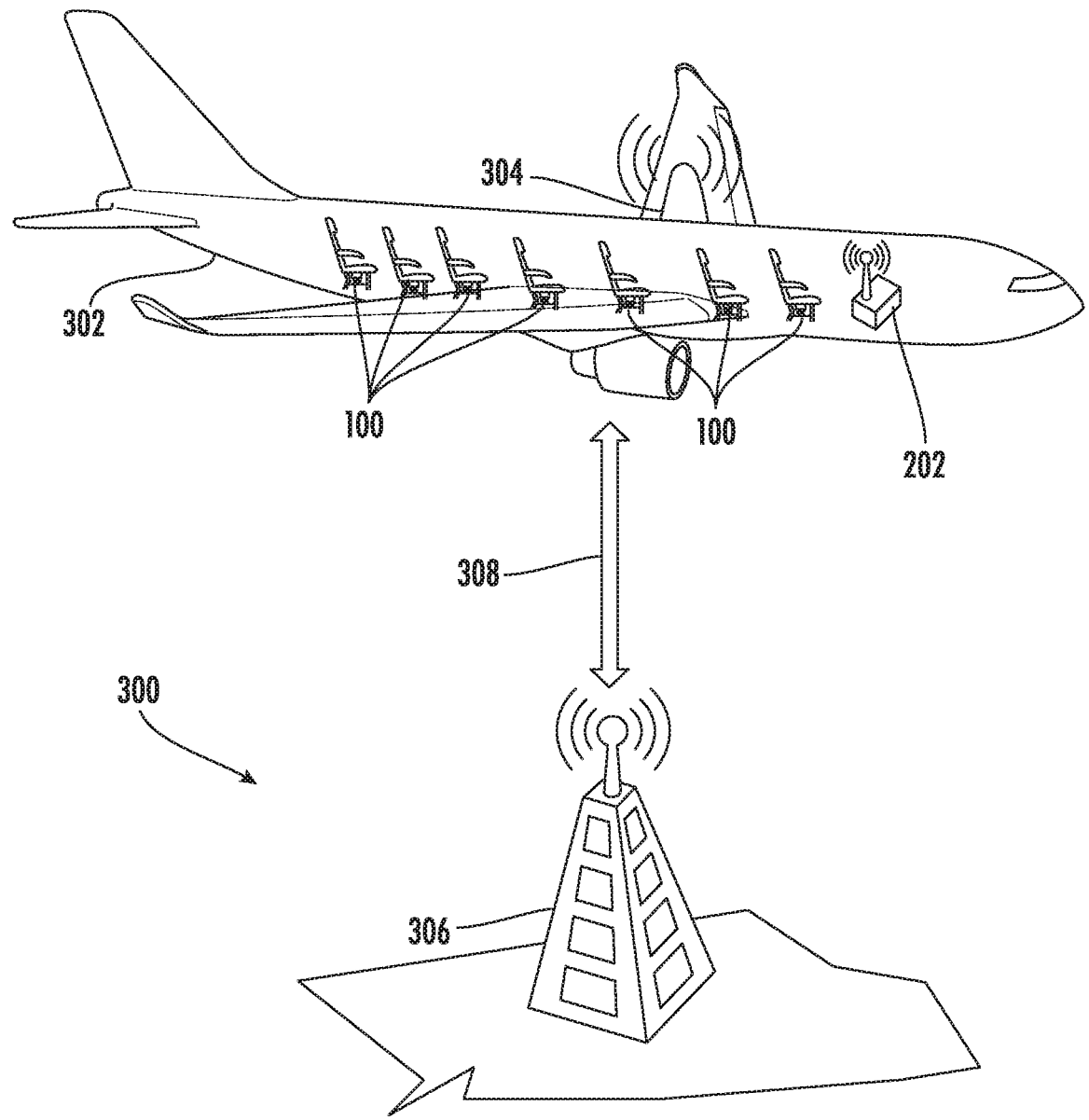
FIG. 3A illustrates a graphical depiction of an aircraft in flight and equipped with multiple smart fabric controllers in communication with an aircraft controller onboard the aircraft, and a main controller in communication with the network onboard the aircraft.

FIG. 3A depicts an example aircraft network generally designated 300 comprising an aircraft 302, the aircraft 302 comprising an aircraft controller 202, one or more smart fabric assemblies 100 inside the aircraft 302, and an antenna 304, and a main controller 306 in electronic communication with the aircraft 302. Those of ordinary skill in the art will appreciate that, in some embodiments, the aircraft 302 can be configured with one or more smart fabric assemblies 100 and that other aircraft structures 102 in the aircraft may or may not have smart fabric 106 attached to it. For example and without limitation, certain classes of seating can be configured with smart fabric 106, such that only some aircraft seats have smart fabric 106, and others do not. For example, the smart fabric 106 option can be associated with an upgrade such that, passengers would pay an upcharge to have a seat configured with smart fabric 106 attached. Connection 308 represents the conduit for electronic communication between the aircraft 302 and the main controller 306. In some embodiments, the connection 308 can be wireless or wired, including for example and without limitation, the wired or wireless connection 308 can be a Wi-Fi connection, a Bluetooth connection, an Ethernet connection, infrared wireless connection, wireless microwave or radio connection, satellite wireless connection, USB, Thunderbolt, HDMI, or other suitable wired or wireless connection that is capable of facilitating electronic communication between the aircraft 302 and the main controller 306.

In the event that the connection 308 is wireless, the main controller 306 can be configured to communicate with the aircraft 302 via antenna 304. In the event that the connection 308 is wired, the aircraft 302 would need to connect to the main controller 306 on the ground. As depicted in FIG. 3A, the aircraft 302 is in the air, flying, and the main controller 306 is on the ground. In some embodiments of the present disclosure, an airline will have many aircraft 302 like the one depicted in FIG. 3A. In that context, it is imperative that aircraft controllers 202 have the latest version of firmware or the expected version of firmware available to update the smart fabric controllers 104 on board. Those of ordinary skill in the art will appreciate that a main controller 306 can be used to send or upload the expected version of firmware to some or all aircraft 302 in the fleet, for example and without limitation, on a regular or periodic basis, or whenever the latest or newest expected version of firmware is ready to be sent out. Moreover, those of ordinary skill in the art will appreciate that in some embodiments, one or more main controllers 306 may be used, based on the requirements of a particular aircraft network 300. In some embodiments, the main controller(s) can forward the expected or latest version of firmware, software, network configuration, etc., to the aircraft 302 via the wired or wireless connection 308 and the aircraft 302 can transmit it to the aircraft controller 202.

In some embodiments of the present disclosure, the main controller 306 can be configured to communicate with an aircraft 302 wirelessly or by wired connection, for example, when the aircraft 302 is on the ground and not in flight. The main controller 306 can be loaded with the latest version or expected version of firmware and can be configured to periodically send the updated firmware to each of the aircraft 302 in the fleets. In some aspects, it is envisioned that the transfer of data from the main controller 306 to the aircraft 302 can occur during flight. In some embodiments, at least some communications between the aircraft controller 202 and, either or both of, the one or more smart fabric controllers 104 and the main controller 306 are authenticated. In some embodiments of the present disclosure, the aircraft controller 202 is configured to use a hardware dongle, a protection key, and/or a secured hardware IP address to authenticate the at least some communications.

Figure 3B:
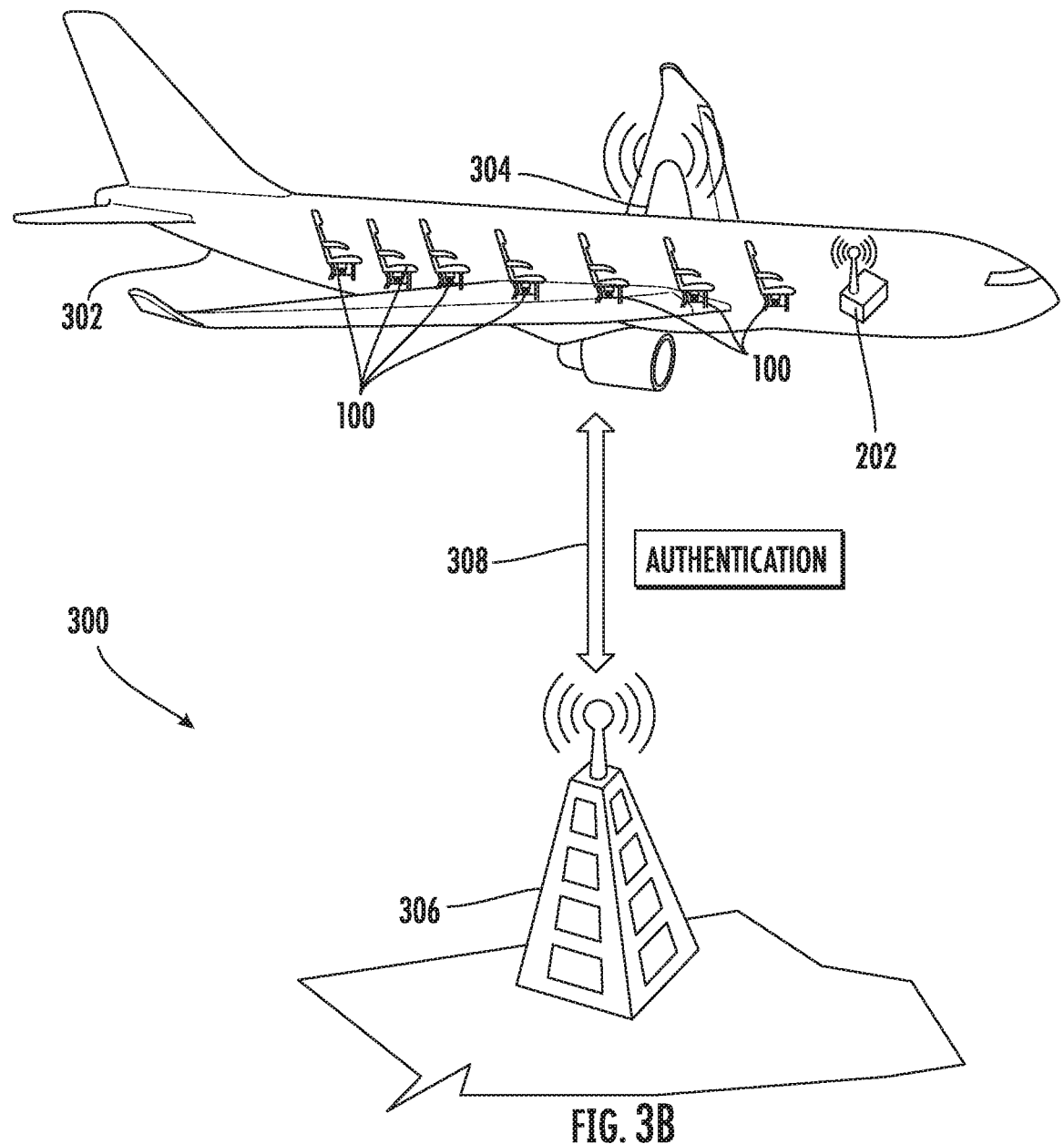
FIG. 3B illustrates a graphical depiction of a communication and authentication process of informing the aircraft controller about the expected version of firmware that the smart fabric controllers should be running.

FIG. 3B depicts the aircraft network 300 from FIG. 3A, but indicates authentication messages or signals as well. In some embodiments of the present disclosure, the main controller 306 and the aircraft 302 are configured to exchange authentication messages or signals with each other in order to verify certain aspects of the communication.

Some of those aspects may include the aircraft 302 identity, firmware version installed on the aircraft controller 202, or a verification that the owner/operator of the aircraft 302 is eligible for an upgrade of their firmware. In some embodiments, a check or verification can be performed to determine if payment by the airline is current for the firmware, and the new firmware will only be available to the aircraft 302 if the airline has paid for the firmware. In such an embodiment, before sending the updated firmware, an authentication that the airline has ordered and paid for the firmware update must occur.

Figure 3C:
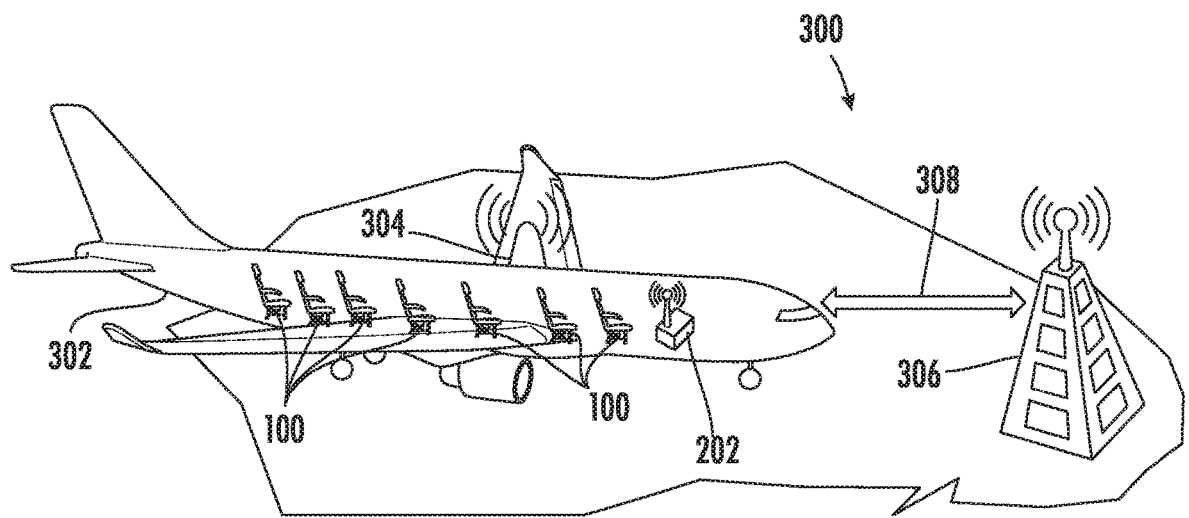
FIG. 3C illustrates a graphical depiction of an aircraft on the ground and equipped with multiple smart fabric controllers in communication with an aircraft controller onboard the aircraft, and a main controller on the ground and in communication with the network onboard the aircraft.

FIG. 3C depicts the aircraft network 300 from FIG. 3A, except in this illustration, the aircraft 302 is on the ground and the main controller 306 is also on the ground. In this embodiment, the connection 308 could still be wireless, but also wired and the main controller 306 could be connected directly to the aircraft 302 for (potentially) faster transmission of the expected version of firmware.

Figure 3D:
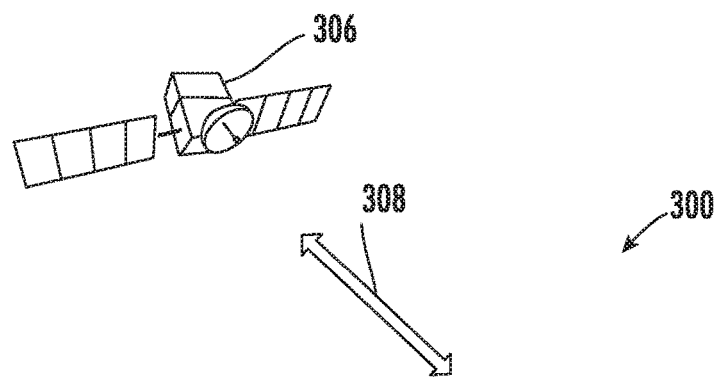
FIG. 3D illustrates a graphical depiction of an aircraft in the air and equipped with multiple smart fabric controllers in communication with an aircraft controller onboard the aircraft, and a main controller as a satellite in the air and in communication with the network onboard the aircraft.
Figure 3D:
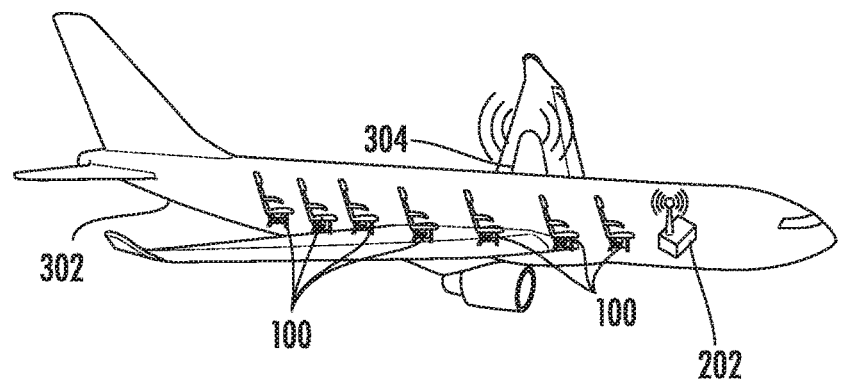

FIG. 3D depicts the aircraft network 300 from FIG. 3A, except in this illustration, the aircraft 302 is in the air and the main controller 306 is not on the ground. In some embodiments, the main controller 306 can be positioned, for example and without limitation, in space as a satellite, it could be on a flying platform, on another aircraft, on a balloon, or on another flying object. In this particular embodiment, the connection 308 could still be wired or wireless. For example, the main controller 306 can be configured to connect with the aircraft 302 via a wire that extends from the main controller 306 in flight to the aircraft 302 in flight.

Figure 4A:
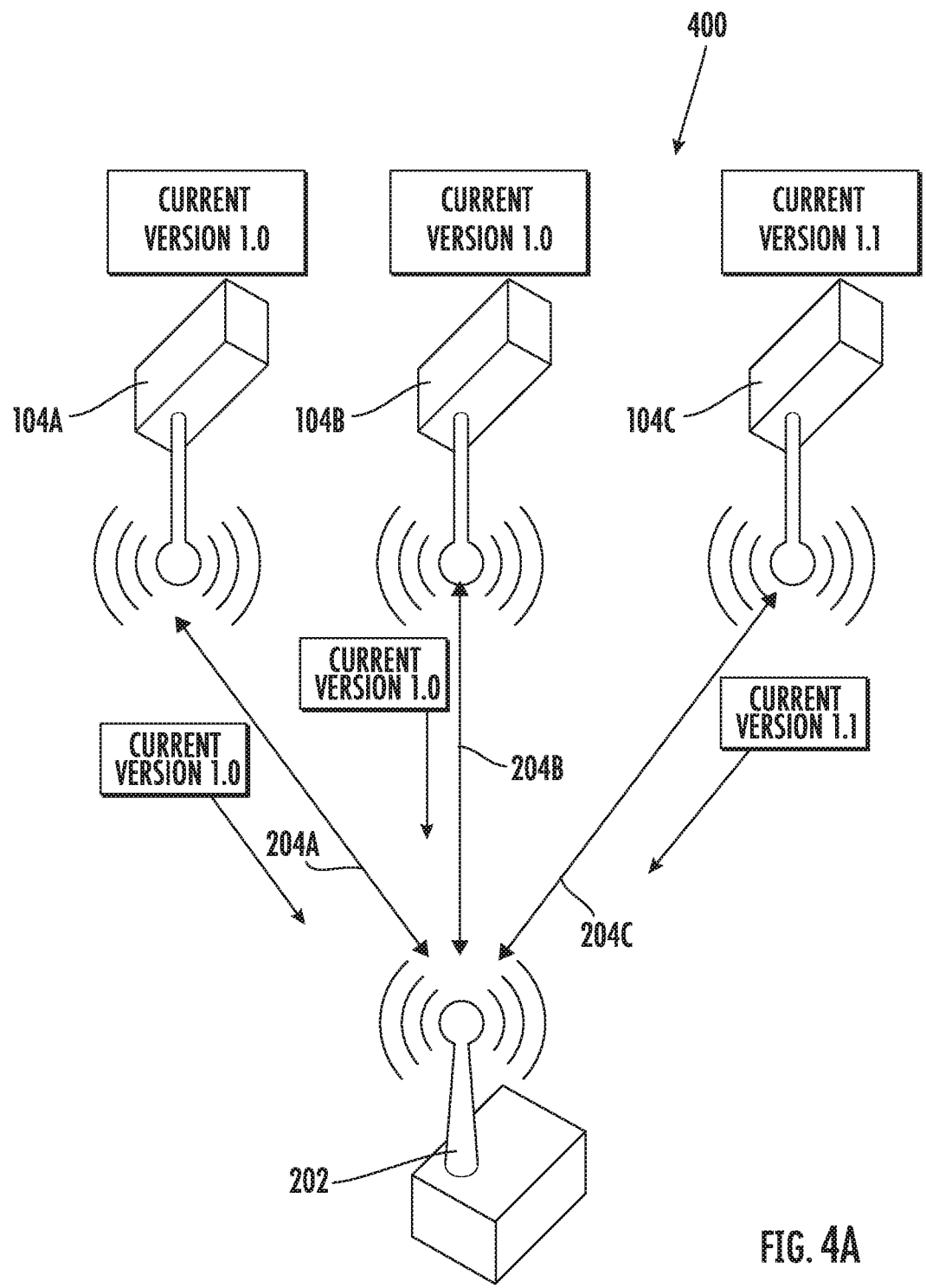
FIGS. 4A, 4B, 4C, 4D, 4E, 4F and 4G illustrate a network diagram depicting a process of upgrading the smart fabric controllers.

FIGS. 4A through 4G depict a network generally designated 400 showing an example of a process for upgrading the smart fabric controllers, first smart fabric controller 104A, second smart fabric controller 104B, and third smart fabric controller 104C. In addition to the operations described above, the first smart fabric controller 104A, second smart fabric controller 104B, third smart fabric controller 104C, and aircraft controller 202 can be further configured to operate as disclosed hereinbelow. In some embodiments, the following process is configured to occur on a regular or periodic basis or could be initiated manually at any time. In FIG. 4A, the network 400 comprises first smart fabric controller 104A, second smart fabric controller 104B, and third smart fabric controller 104C, each in electronic communication with an aircraft controller 202, via first connection 404A, second connection 404B, and third connection 404C, respectively. As described previously, each of first connection 404A, second connection 404B, and third connection 404C can be wired and/or wireless connections.

The version indicated above the first smart fabric controller 104A, second smart fabric controller 104B, and third smart fabric controller 104C indicates the present or current version of firmware executing at each stage of the process. For example, at this step, in network 400, first smart fabric controller 104A and second smart fabric controller 104B are each executing firmware version 1.0, and third smart fabric controller 104C is executing firmware version 1.1. The representation of the current version of firmware is displayed merely for visualization purposes to help in understanding the process. Moreover, first connection 404A, second connection 404B, and/or third connection 404C, in some embodiments can be configured as unidirectional or bidirectional connections. As shown in FIG. 4A, in network 400, each of the first smart fabric controller 104A, second smart fabric controller 104B, and third smart fabric controller 104C is configured to send a message indicating the current version of firmware executing on the respective smart fabric controller to the aircraft controller 202.

Figure 4B:
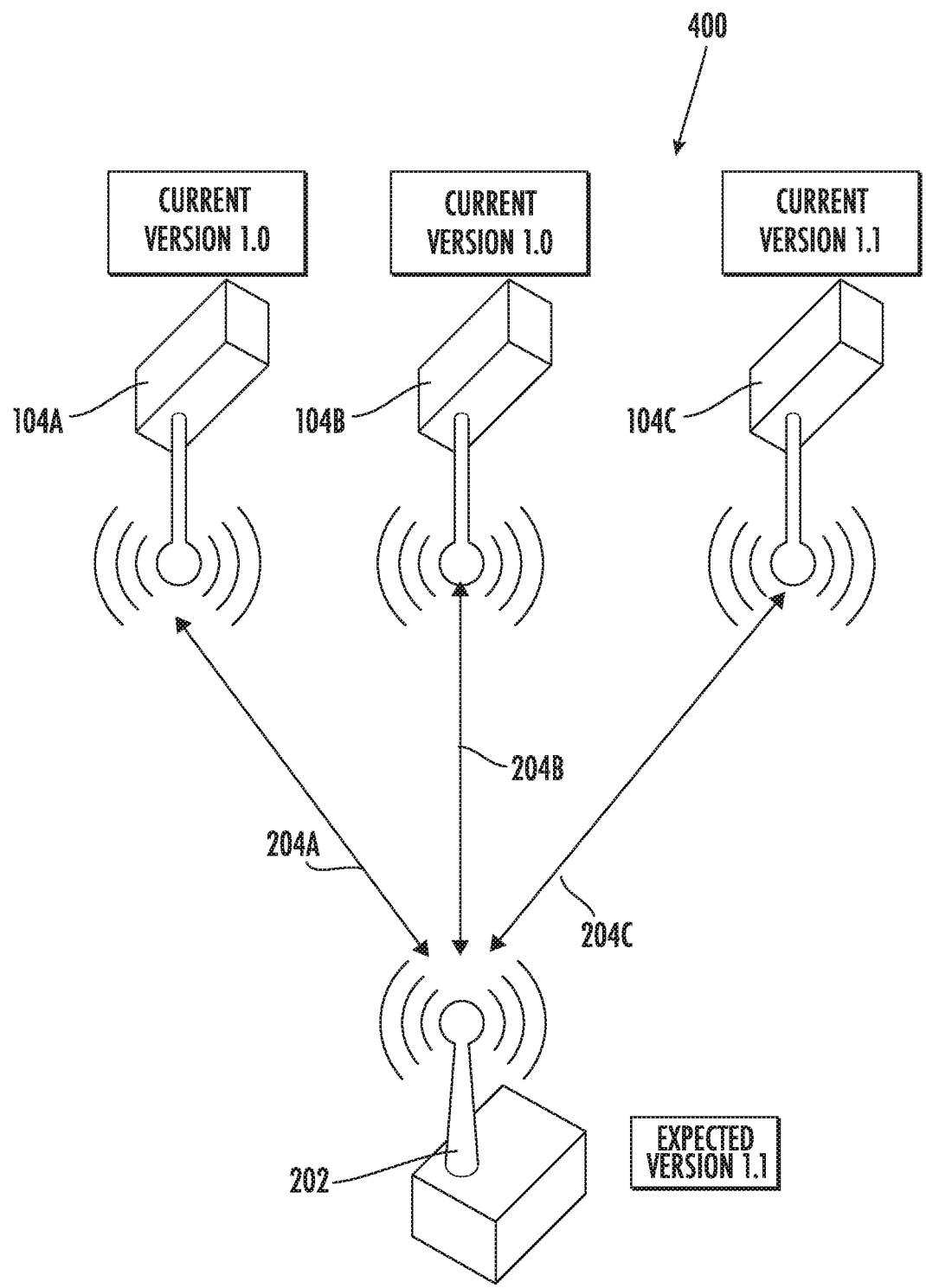

FIG. 4B depicts the same network 400 as described hereinabove. In addition, FIG. 4B indicates that the aircraft controller 202 has the current expected version of firmware. In the instance depicted in FIG. 4B, the current expected version of firmware is version 1.1. However, first smart fabric controller 104A and second smart fabric controller 104B are executing version 1.0 and third smart fabric controller 104C is running the expected version of firmware, version 1.1.

Figure 4C:
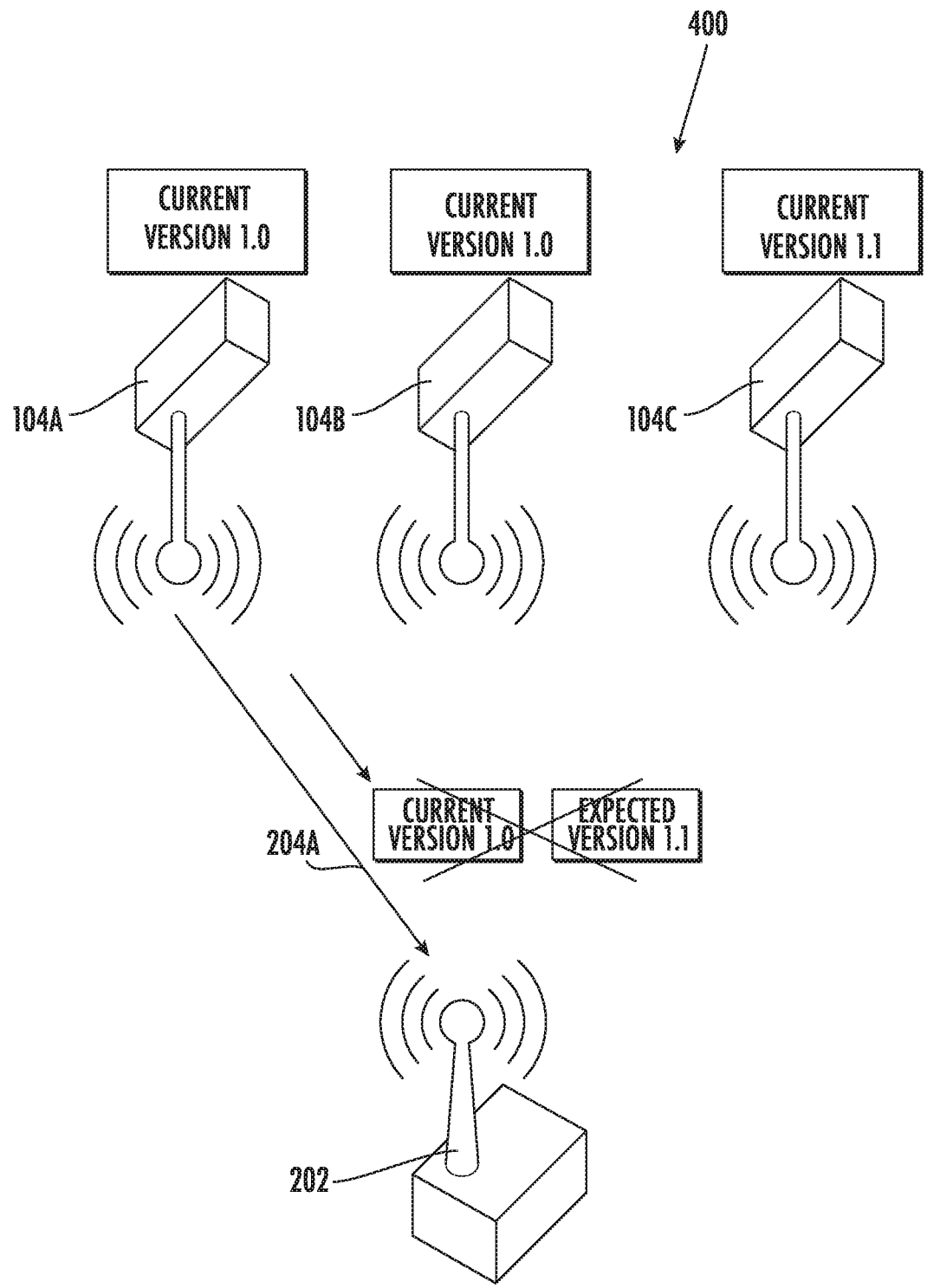

FIG. 4C depicts the next stage in the upgrading process, after the aircraft controller 202 receives the message on first connection 404A from the first smart fabric controller 104A containing an indication of the current version of firmware executing on the first smart fabric controller 104A. In some embodiments of the present disclosure, the aircraft controller 202 is configured to receive the message and compare the received version number with the expected version of firmware. In the example depicted in FIG. 4C, the message shows that first smart fabric controller 104A is running firmware version 1.0 and the expected version of firmware is version 1.1. Therefore, there is not a match, indicated by the "X" over the versions being compared. Because there is not a match, the updated version of firmware needs to be sent to first smart fabric controller 104A. In some embodiments, the aircraft controller 202 is configured to send the firmware or software package for updating to the first smart fabric controller 104A. In some embodiments, for example and without limitation, the aircraft controller 202 is configured to automatically, manually, or periodically, send the updated firmware package to the first smart fabric controller 104A.

Figure 4D:
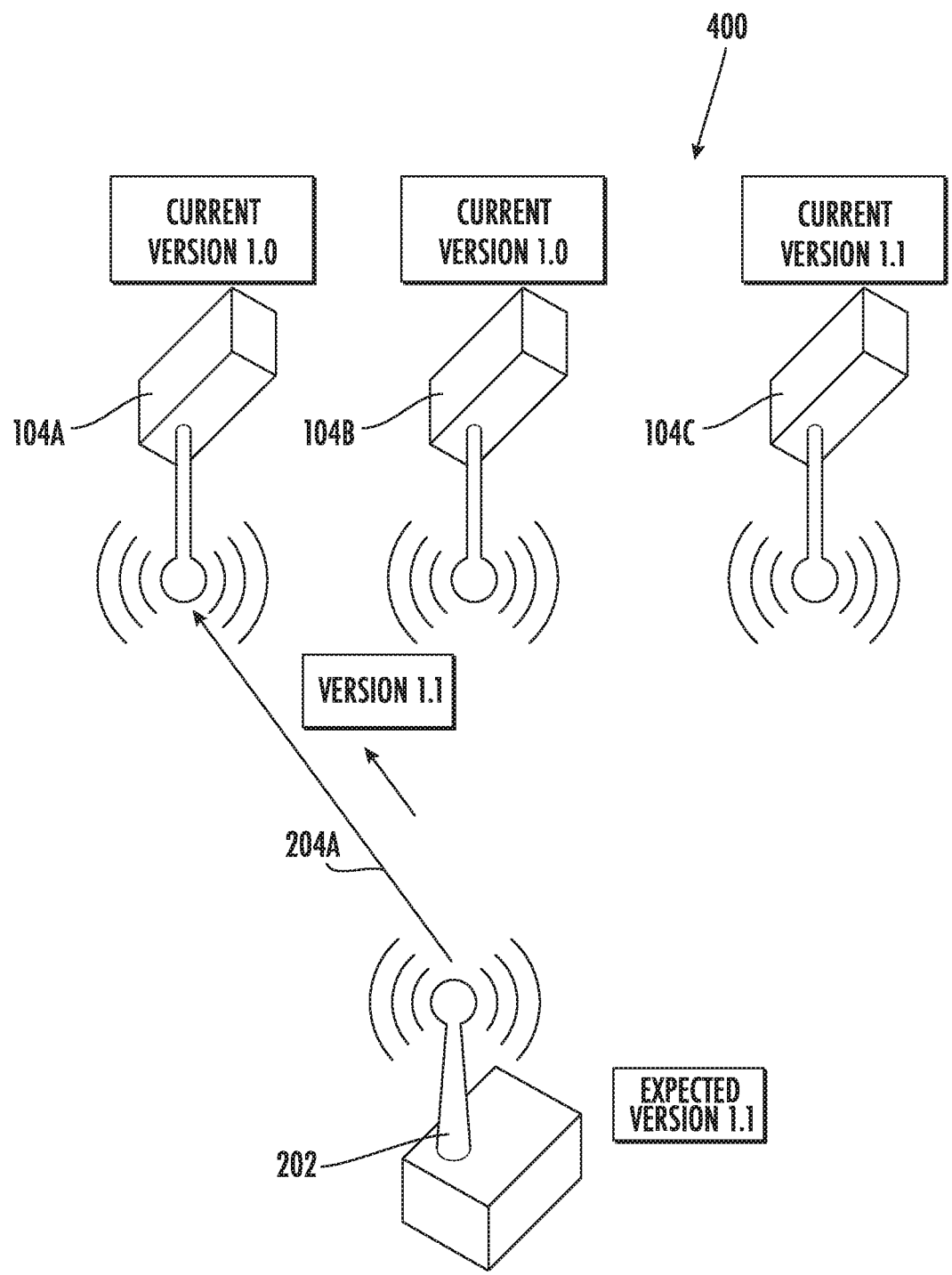

In FIG. 4D, once the comparison between the received version of firmware from the first smart fabric controller 104A and the expected version of firmware occurs, then the aircraft controller 202 is configured to send an electronic communication, via first connection 404A, comprising the expected version 1.1 firmware back to the first smart fabric controller 104A. After the first smart fabric controller 104A receives the new firmware, it is configured to upgrade to that new firmware.

Figure 4E:
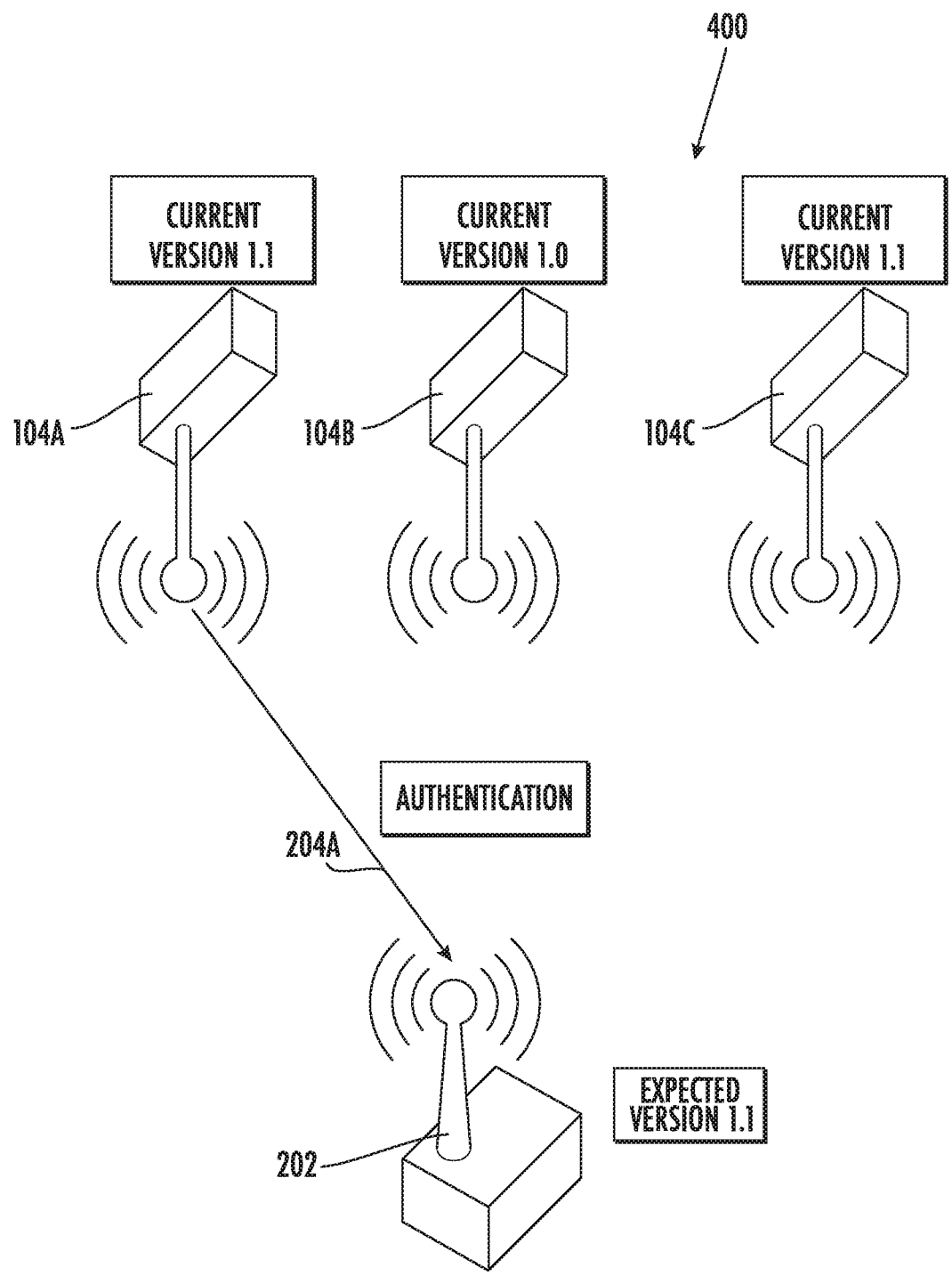

FIG. 4E illustrates that in some embodiments of the present disclosure, after upgrading to the new firmware sent by the aircraft controller 202, the first smart fabric controller 104A will send an authentication message back to the aircraft controller 202 via first connection 404A confirming that the upgrade was successful. As indicated by the current version element above first smart fabric controller 104A in the figure, the first smart fabric controller 104A has upgraded to version 1.1. In some embodiments, the first connection 404A, second connection 404B, and third connection 404C are configured to carry communications between the smart fabric controllers, first smart fabric controller 104A, second smart fabric controller 104B, and third smart fabric controller 104C, respectively, and the aircraft controller 202, including instructions for changing the properties and characteristics of the smart fabric 106 controlled by the individual smart fabric controllers 104.

In still other embodiments of the present disclosure, other parameters or messages or signals might need to be authenticated or acknowledged as may be the case. For example some computer networking protocols, such as transmission control protocol (TCP), need to exchange information and messages or signals using a three-way "handshake". This "handshake" is an exchange of messages or signals sending data from one device to the other and the other device sending back an acknowledgement that the message was received. Those of ordinary skill in the art will appreciate that some embodiments will utilize TCP or a similar protocol for message authentication.

In further embodiments of the present disclosure, the aircraft controller 202 and first smart fabric controller 104A can be configured to exchange other messages or signals besides firmware upgrades, and part of the exchange of that data will require that the first smart fabric controller 104A authenticate that it is a proper device on the aircraft network 400. This authentication can be performed by the aircraft controller 202 by comparing a feature or parameter of the first smart fabric controller 104A with a database of known features or parameters to ensure that the first smart fabric controller 104A is supposed to be a member of the network 400 for security and authentication purposes. For example and without limitation, in some embodiments, the first smart fabric controller 104A can be authenticated as a member of the network by the aircraft controller 202 inspecting the media access control (MAC) address, a hardware dongle, a protection key, or secured hardware internet protocol (IP) address of the first smart fabric controller 104A. In some embodiments of the present disclosure, each of the first smart fabric controller 104A, second smart fabric controller 104B, and third smart fabric controller 104C will have unique security identifiers, described above, for authentication purposes. Additionally, in some embodiments, other security protocols may be used including, for example and without limitation, physical security identifiers, barcodes, QR codes, and/or other suitable physical security identifiers on the first smart fabric controller 104A, second smart fabric controller 104B, and third smart fabric controller 104C.

Figure 4F:
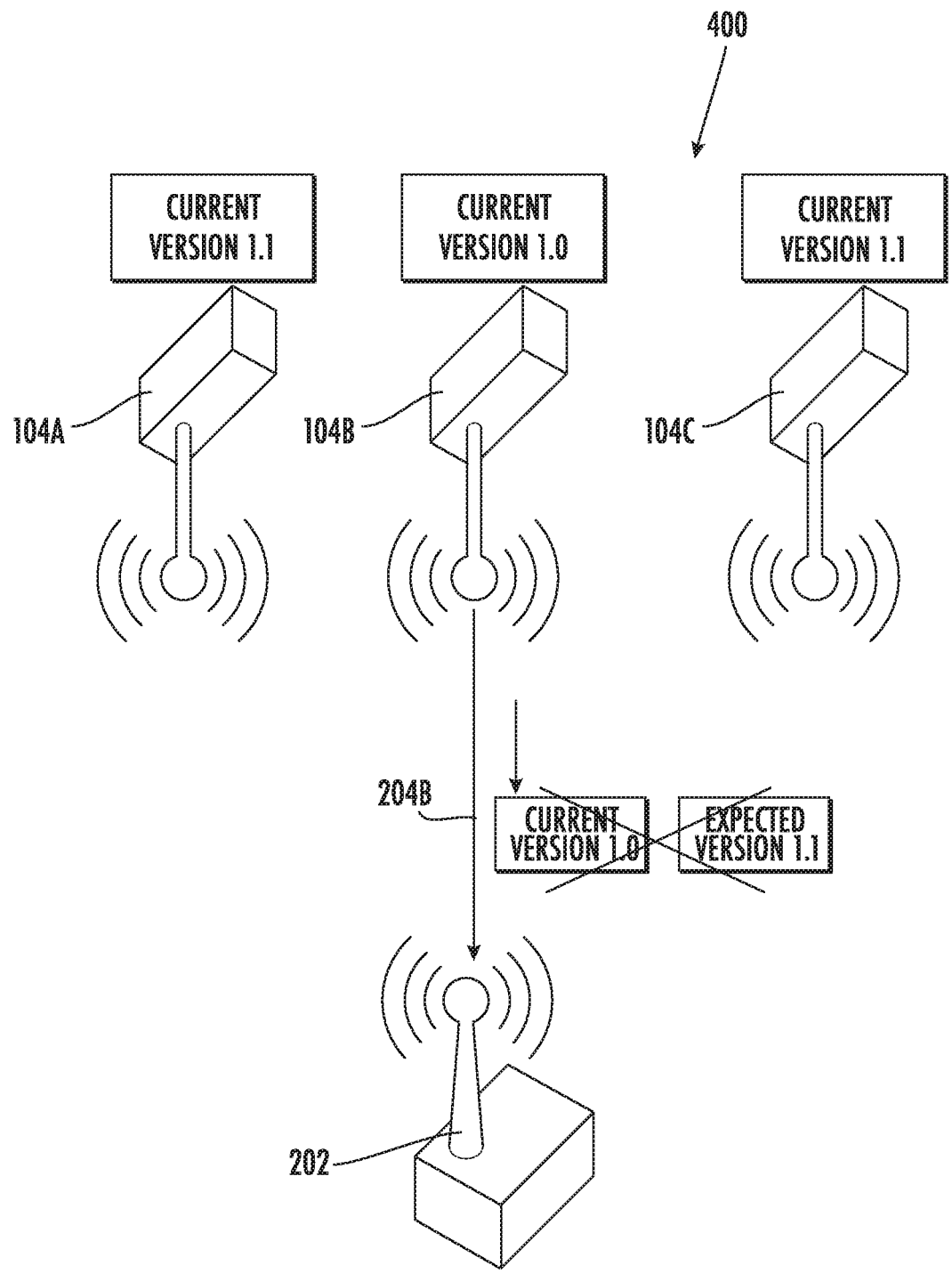

FIG. 4F is an illustration of network 400 wherein second smart fabric controller 104B is also running firmware version 1.0. Like first smart fabric controller 104A in FIG. 4C, second smart fabric controller 104B is configured to send the message on second connection 404B, indicating that it is executing firmware version 1.0. Then, in some embodiments, the aircraft controller 202 is configured to compare the firmware version indicated in that message to the expected firmware version, in this case version 1.1, and send an update back to the second smart fabric controller 104B if an updated version of firmware is needed. Like in FIG. 4E, the second smart fabric controller 104B is configured in some embodiments to authenticate or acknowledge that an update has successfully occurred as well as the other authentication methods described hereinabove.

Figure 4G:
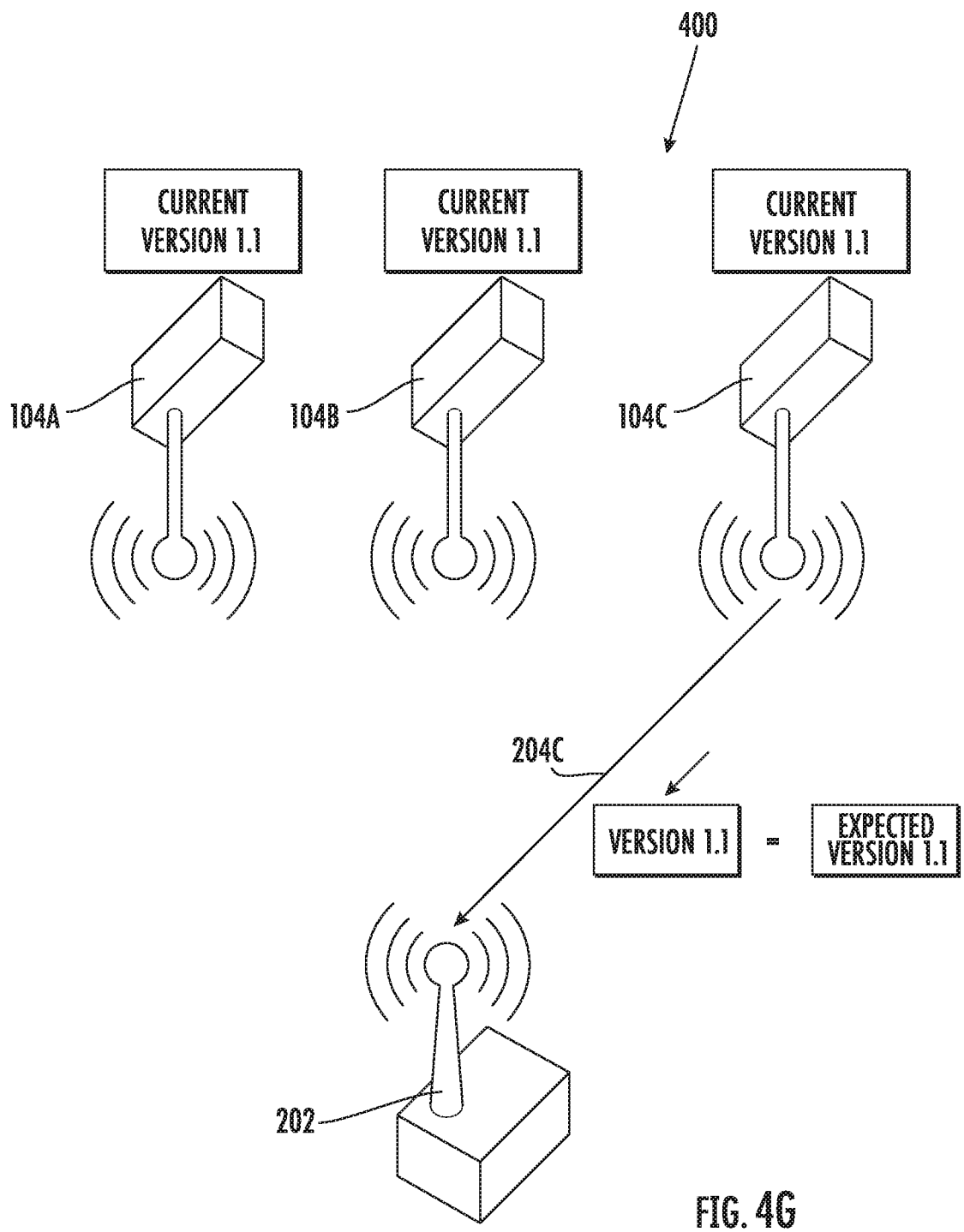

FIG. 4G is an illustration of network 400 wherein third smart fabric controller 104C is running firmware version 1.1. Also, as indicated by the version indicators above the smart fabric controller in the figure, both first smart fabric controller 104A and second smart fabric controller 104B are now running version 1.1, the expected version of code, after their respective updates. In some embodiments, third smart fabric controller 104C is configured to send a message to the aircraft controller 202 indicating the current version it is executing. After comparing the version in the message to the expected version, 1.1 in both cases, the aircraft controller 202 is configured not to send any updates to the third smart fabric controller 104C because the version of firmware it is executing is the expected version. Those of ordinary skill in the art will appreciate that the upgrade process described hereinabove may be performed between the aircraft controller 202 and multiple smart fabric controllers 104 at the same time. For example, the upgrade process of first smart fabric controller 104A, second smart fabric controller 104B, and third smart fabric controller 104C could be performed simultaneously or separately and at different times depending on the processing and other resources of the aircraft controller 202.

In further embodiments of the present disclosure, during the update stage depicted in FIG. 4A through 4G, the aircraft controller 202 is also configured to detect whether smart fabric 106 on any of the aircraft structures 102 needs to be replaced or is damaged and needs repair. In such a case, each of the smart fabric controllers 104 are configured to detect whether the smart fabric 106 it is controlling needs to be replaced or repaired and automatically send a notification regarding the same along connection 404 to the aircraft controller 202.

Although FIGS. 4A through 4G depict only three smart fabric controllers 104, two of which were not updated at the beginning, those of ordinary skill in the art will appreciate that the above example can be broadened to include more than the three smart fabric controllers 104, including many more that need firmware upgrades.

Figure 5A:
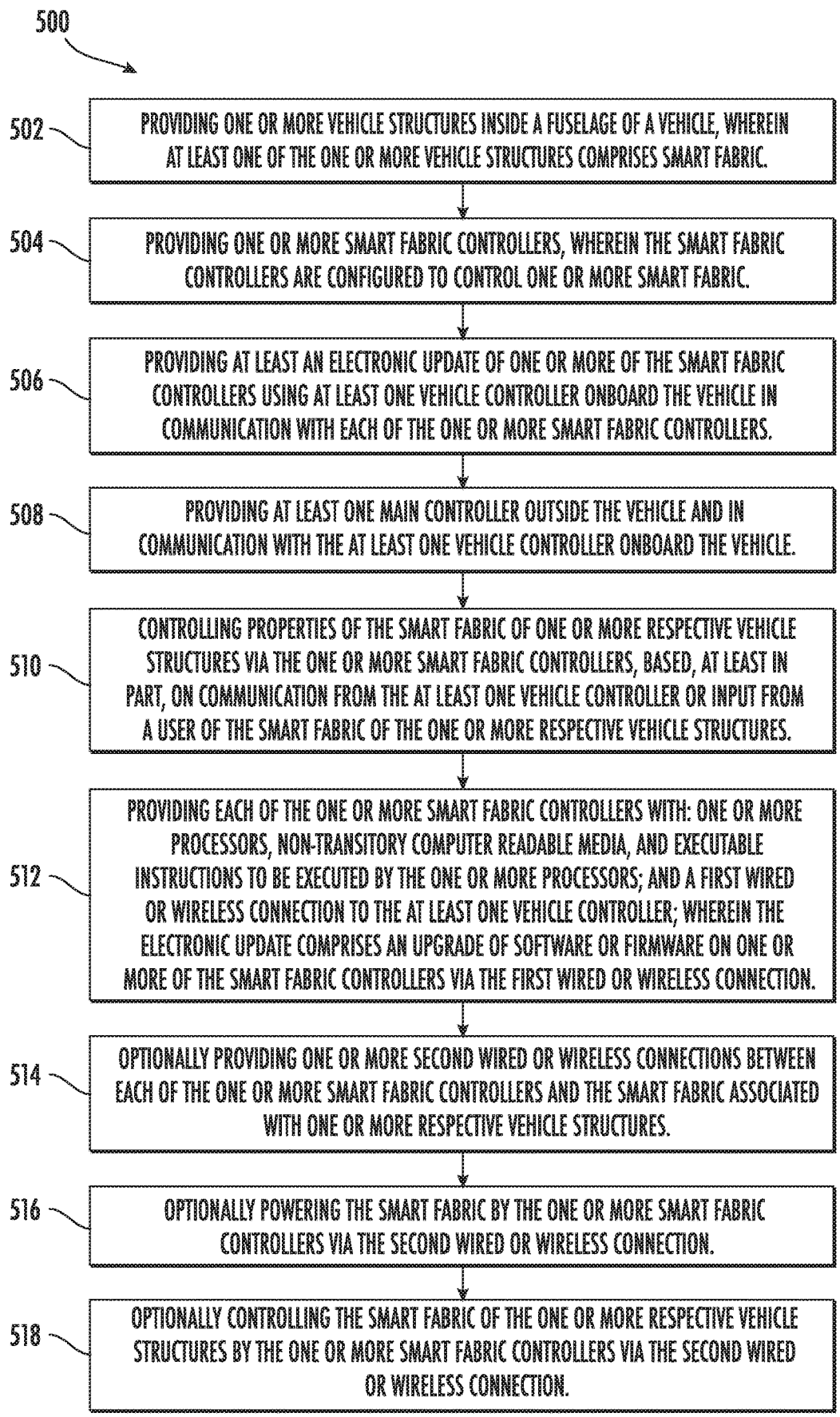
FIG. 5A is a flow chart illustrating steps of an example method of controlling smart fabric in an aircraft, including some optional steps.

FIG. 5A illustrates an example flow chart of steps of an example method generally designated 500 for controlling one or more smart fabrics according to some embodiments of the present disclosure. Step 1 502 of the example method 500 includes providing one or more vehicle structures inside a fuselage of a vehicle, wherein at least one of the one or more vehicle structures comprises smart fabric. Step 2 504 of the example method 500 includes providing one or more smart fabric controllers, wherein the smart fabric controllers are configured to control one or more smart fabric. Step 3 506 of the example method 500 includes providing at least an electronic update of one or more of the smart fabric controllers using at least one vehicle controller onboard the vehicle in communication with each of the one or more smart fabric controllers. Step 4 508 of the example method 500 includes providing at least one main controller outside the vehicle and in communication with the at least one vehicle controller onboard the vehicle. Step 5 510 of the example method 500 includes controlling properties of the smart fabric of one or more respective vehicle structures via the one or more smart fabric controllers, based, at least in part, on communication from the at least one vehicle controller or input from a user of the smart fabric of the one or more respective vehicle structures.

Step 6 512 of the example method 500 includes providing each of the one or more smart fabric controllers with: one or more processors, non-transitory computer readable media, and executable instructions to be executed by the one or more processors; and a first wired or wireless connection to the at least one vehicle controller; wherein the electronic update comprises an upgrade of software or firmware on one or more of the smart fabric controllers via the first wired or wireless connection. Step 7 514 of the example method 500 is an optional step and includes optionally providing one or more second wired or wireless connections between each of the one or more smart fabric controllers and the smart fabric associated with one or more respective vehicle structures. Step 8 516 of the example method 500 is another optional step and includes optionally powering the smart fabric by the one or more smart fabric controllers via the second wired or wireless connection. Step 9 518 of the example method 500 is another optional step and includes optionally manipulating the smart fabric of the one or more respective vehicle structures by the one or more smart fabric controllers via the second wired or wireless connection.

Figure 5B:
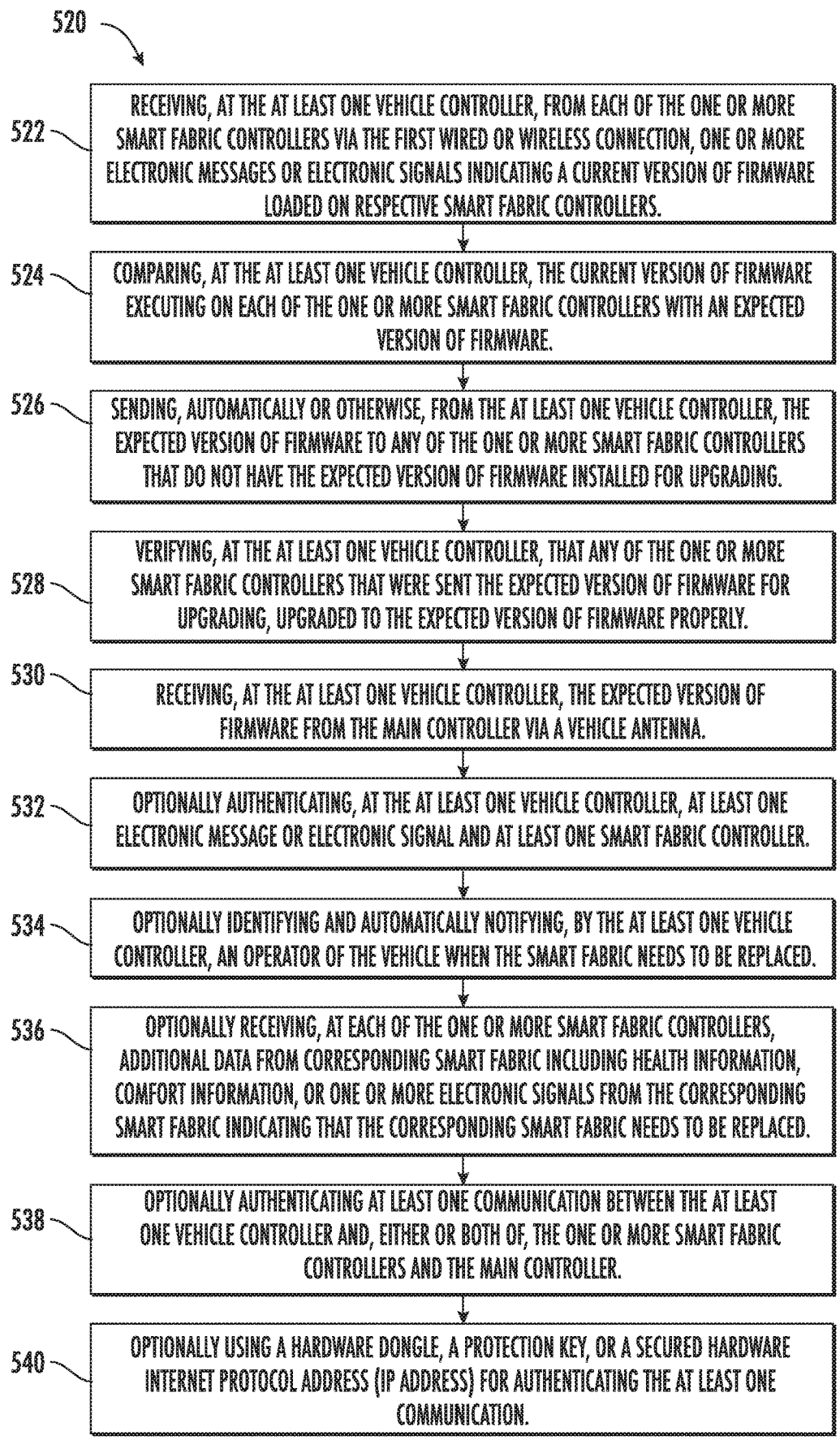
FIG. 5B is a flow chart illustrating additional steps, including some optional steps.

FIG. 5B illustrates further steps 520 in the example method 500 according to the subject matter of the present disclosure. Step 10 522 in the example method 500 includes receiving, at the at least one vehicle controller, from each of the one or more smart fabric controllers via the first wired or wireless connection, one or more electronic messages or electronic signals indicating a current version of firmware loaded on respective smart fabric controllers. Step 11 524 in the example method 500 includes comparing, at the at least one vehicle controller, the current version of firmware executing on each of the one or more smart fabric controllers with an expected version of firmware. Step 12 526 in the example method 500 includes sending, automatically or otherwise, from the at least one vehicle controller, the expected version of firmware to any of the one or more smart fabric controllers that do not have the expected version of firmware installed for upgrading.

Step 13 528 in the example method 500 includes verifying, at the at least one vehicle controller, that any of the one or more smart fabric controllers that were sent the expected version of firmware for upgrading, upgraded to the expected version of firmware properly. Step 14 530 in the example method 500 includes receiving, at the at least one vehicle controller, the expected version of firmware from the main controller via a vehicle antenna. Step 15 532 is an optional step in the example method 500 and includes optionally authenticating, at the at least one vehicle controller, at least one electronic message or electronic signal and at least one smart fabric controller. Step 16 534 is an optional step in the example method 500 and includes optionally identifying and automatically notifying, by the at least one vehicle controller, an operator of the vehicle when the smart fabric needs to be replaced.

Step 17 536 is an optional step in the example method 500 and includes optionally receiving, at each of the one or more smart fabric controllers, additional data from corresponding smart fabric including health information, comfort information, or one or more electronic signals from the corresponding smart fabric indicating that the corresponding smart fabric needs to be replaced. Step 18 538 is an optional step in the example method 500 and includes optionally authenticating at least one communication between the at least one vehicle controller and, either or both of, the one or more smart fabric controllers and the main controller. Step 19 540 is an optional step in the example method 500 and includes optionally using a hardware dongle, a protection key, or a secured hardware Internet Protocol address (IP address) for authenticating the at least one communication.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. A system for controlling one or more smart fabrics in an aircraft to provide a better passenger experience while flying, the system comprising:
   one or more aircraft structures inside the aircraft;
   at least one or more of the aircraft structures comprising smart fabric configured to receive direct or indirect input from a passenger occupying, leaning against, standing on, or touching a respective aircraft structure;
   one or more smart fabric controllers located near one or more corresponding aircraft structures, wherein each of the smart fabric controllers are configured to control one or more properties of the one or more smart fabric of the one or more corresponding aircraft structures, based at least in part on the received input;
   at least one aircraft controller onboard the aircraft in communication with each of the one or more smart fabric controllers and configured to provide at least an electronic update of the smart fabric controllers; and
   at least one main controller outside the aircraft and in communication with the at least one aircraft controller onboard the aircraft,
   wherein the aircraft controller is configured to actively control one or more properties of the one or more smart fabric of the one or more corresponding aircraft structures by sending control communications to the smart fabric controllers.

2. The system of claim 1, wherein each of the one or more smart fabric controllers further comprise:
   one or more processors, non-transitory computer readable media, and executable instructions to be executed by the one or more processors; and
   a first wired or wireless connection to the at least one aircraft controller.

3. The system of claim 2, wherein the electronic update of the smart fabric controllers comprises an upgrade of software or firmware on one or more of the smart fabric controllers via the first wired or wireless connection.

4. The system of claim 2, wherein each of the one or more smart fabric controllers further comprises:
   one or more second wired or wireless connections to the smart fabric of the one or more corresponding aircraft structures,
   wherein each of the one or more smart fabric controllers is configured to provide power to the smart fabric it is configured to control via the one or more second wired or wireless connections, and
   wherein each of the one or more smart fabric controllers is configured to control the smart fabric of the one or more corresponding aircraft structures via the one or more second wired or wireless connections.

5. The system of claim 2, wherein the at least one aircraft controller is configured to:
   receive from each of the one or more smart fabric controllers, via the first wired or wireless connection, one or more electronic messages or electronic signals indicating a current version of firmware loaded on respective smart fabric controllers;
compare the current version of firmware installed on each of the one or more smart fabric controllers with an expected version of firmware;
send, either automatically or not automatically, the expected version of firmware to any of the one or more smart fabric controllers that do not have the expected version of firmware installed for upgrading; and
verify that any of the one or more smart fabric controllers that were sent the expected version of firmware for upgrading were upgraded to the expected version of firmware properly.

6. The system of claim 5, wherein the aircraft controller is configured to receive the expected version of firmware from the main controller via an aircraft antenna.

7. The system of claim 5, wherein the at least one aircraft controller is further configured to:
authenticate electronic messages or electronic signals and smart fabric controllers; and
identify and automatically notify an operator of the aircraft when the smart fabric needs to be replaced.

8. The system of claim 1, wherein at least one of the aircraft structures further comprises at least one of the one or more smart fabric controllers affixed to the at least one aircraft structures.

9. The system of claim 1, wherein each of the one or more smart fabric controllers is further configured to receive additional data from corresponding smart fabric including health information, comfort information, or one or more electronic signals from corresponding smart fabric indicating that the smart fabric needs to be replaced.

10. The system of claim 1, wherein at least some communications between the aircraft controller and, either or both of, the one or more smart fabric controllers and the main controller are authenticated;
wherein the aircraft controller is configured to use a hardware dongle, a protection key, or a secured hardware Internet Protocol address (IP address) to authenticate the at least some communications.

11. The system of claim 1, wherein the smart fabric comprises one or more processors, sensors, user input devices, cooling systems, heating systems, or LEDs, or a heartrate monitor or other vital sign monitor.

12. The system of claim 1, wherein the one or more aircraft structures comprises one or more of the following: one or more passenger seats, beds, benches, chairs, cots, stools, one or more fuselage walls, and one or more fuselage floors.

13. A method for controlling one or more smart fabrics in an aircraft to provide a better passenger experience while flying, the method comprising:
providing one or more aircraft structures inside the aircraft wherein at least one of the one or more aircraft structures comprises smart fabric, the smart fabric being configured to receive direct or indirect input from a passenger occupying, leaning against, standing on, or touching a respective aircraft structure;
providing one or more smart fabric controllers located near one or more corresponding aircraft structures, wherein each of the the smart fabric controllers are configured to control one or more properties of the one or more smart fabric of the one or more corresponding aircraft structures, based at least in part on the received input;
providing at least an electronic update of one or more of the smart fabric controllers using at least one aircraft controller onboard the aircraft in communication with each of the one or more smart fabric controllers; and
providing at least one main controller outside the aircraft and in communication with the at least one aircraft controller onboard the aircraft;
wherein the aircraft controller is configured to actively control one or more properties of the one or more smart fabric of the one or more corresponding aircraft structures by sending control communications to the smart fabric controllers.

14. The method of claim 13, further comprising:
providing each of the one or more smart fabric controllers with:
one or more processors, non-transitory computer readable media, and executable instructions to be executed by the one or more processors; and
a first wired or wireless connection to the at least one aircraft controller;
wherein the electronic update comprises an upgrade of software or firmware on one or more of the smart fabric controllers via the first wired or wireless connection.

15. The method of claim 14 further comprising:
providing one or more second wired or wireless connections between each of the one or more smart fabric controllers and the smart fabric associated with one or more corresponding aircraft structures;
powering the smart fabric by the one or more smart fabric controllers via the second wired or wireless connection; and
controlling the smart fabric of the one or more corresponding aircraft structures by the one or more smart fabric controllers via the second wired or wireless connection.

16. The method of claim 14, further comprising:
receiving, at the at least one aircraft controller, from each of the one or more smart fabric controllers via the first wired or wireless connection, one or more electronic messages or electronic signals indicating a current version of firmware loaded on respective smart fabric controllers;
comparing, at the at least one aircraft controller, the current version of firmware executing on each of the one or more smart fabric controllers with an expected version of firmware;
sending, automatically or not automatically, from the at least one aircraft controller, the expected version of firmware to any of the one or more smart fabric controllers that do not have the expected version of firmware installed for upgrading; and
verifying, at the at least one aircraft controller, that any of the one or more smart fabric controllers that were sent the expected version of firmware for upgrading, upgraded to the expected version of firmware properly.

17. The method of claim 16, further comprising receiving, at the at least one aircraft controller, the expected version of firmware from the main controller via an aircraft antenna.

18. The method of claim 16, further comprising:
authenticating, at the at least one aircraft controller, at least one electronic message or electronic signal and at least one smart fabric controller; and
identifying and automatically notifying, by the at least one aircraft controller, an operator of the aircraft when the smart fabric needs to be replaced.

19. The method of claim 13, further comprising receiving, at each of the one or more smart fabric controllers, additional data from corresponding smart fabric including health information, comfort information, or one or more electronic signals from the corresponding smart fabric indicating that the corresponding smart fabric needs to be replaced.

20. The method of claim 13, further comprising:
authenticating at least one communication between the at least one aircraft controller and, either or both of, the one or more smart fabric controllers and the main controller; and
using a hardware dongle, a protection key, or a secured hardware Internet Protocol address (IP address) for authenticating the at least one communication.

21. The method of claim 13, wherein the smart fabric comprises one or more processors, sensors, user input devices, cooling systems, heating systems, or LEDs, or a heartrate monitor or other vital sign monitor.

* * * * *